PATENT

(12) United States Patent
Nakatsugawa et al.

(10) Patent No.: US 9,641,600 B2
(45) Date of Patent: May 2, 2017

(54) SYSTEM, METHOD, COMPUTER-READABLE MEDIUM AND APPARATUS

(71) Applicant: FUJITSU LIMITED, Kawasaki-shi, Kanagawa (JP)

(72) Inventors: Keiichi Nakatsugawa, Shinagawa (JP); Shinya Kano, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 449 days.

(21) Appl. No.: 14/279,703

(22) Filed: May 16, 2014

(65) Prior Publication Data
US 2014/0351311 A1 Nov. 27, 2014

(30) Foreign Application Priority Data

May 24, 2013 (JP) ................................ 2013-109629

(51) Int. Cl.
*H04L 29/08* (2006.01)
*H04L 29/06* (2006.01)

(52) U.S. Cl.
CPC .......... *H04L 67/10* (2013.01); *H04L 67/2833* (2013.01); *H04L 67/325* (2013.01); *H04L 69/28* (2013.01)

(58) Field of Classification Search
CPC ....... H04L 67/10; H04L 69/28; H04L 67/325; H04L 67/2833
See application file for complete search history.

(56) References Cited

U.S. PATENT DOCUMENTS

| 2004/0139224 A1* | 7/2004 | Nishimura | H04L 45/16 709/238 |
| 2006/0143439 A1* | 6/2006 | Arumugam | G06Q 10/08 713/153 |
| 2009/0198475 A1* | 8/2009 | Sato | G06Q 10/10 702/188 |
| 2009/0207778 A1* | 8/2009 | Wang | H04B 7/026 370/315 |

(Continued)

FOREIGN PATENT DOCUMENTS

| JP | 2008-294774 | 12/2008 |
| JP | 2010-257330 | 11/2010 |

(Continued)

*Primary Examiner* — Dustin Nguyen
*Assistant Examiner* — Juan C Turriate Gastulo
(74) *Attorney, Agent, or Firm* — Westerman, Hattori, Daniels & Adrian, LLP

(57) ABSTRACT

A system includes a terminal apparatus configured to generate pieces of data, each of the pieces of data including time information indicating when each of the pieces of data is generated; a destination apparatus configured to accumulate the pieces of data; a relay apparatus configured to store the pieces of data transmitted from the terminal apparatus based on the time information and to relay the pieces of data to the destination apparatus; and a processing apparatus configured to acquire the pieces of data that are stored in the relay apparatus and to process the pieces of data, wherein the relay apparatus is configured to store an amount of the pieces of data in the relay apparatus based on the time information, the amount corresponding to an amount of data that the processing apparatus processes based on a time range of the pieces of data.

16 Claims, 31 Drawing Sheets

(56) References Cited

U.S. PATENT DOCUMENTS

| | | |
|---|---|---|
| 2010/0121826 A1 | 5/2010 | Mitsuhashi |
| 2010/0241656 A1 | 9/2010 | Iswasaki et al. |
| 2011/0022812 A1* | 1/2011 | van der Linden .... G06F 9/5077 711/163 |
| 2011/0087612 A1* | 4/2011 | Yuasa .................... G06Q 10/08 705/332 |
| 2011/0087915 A1* | 4/2011 | Zhang ................. H04L 12/1854 714/2 |
| 2012/0047113 A1* | 2/2012 | Weinberger ....... G06F 17/30584 707/693 |
| 2013/0250959 A1* | 9/2013 | Van Wyk ............ H04W 28/065 370/393 |
| 2014/0233375 A1* | 8/2014 | Thubert ............ H04W 72/1242 370/230 |
| 2014/0379622 A1* | 12/2014 | Arsenault ................ G06N 5/04 706/14 |

FOREIGN PATENT DOCUMENTS

| | | |
|---|---|---|
| WO | 2008-071035 | 3/2008 |
| WO | WO 2008/105406 | 9/2008 |

\* cited by examiner

SYSTEM, METHOD, COMPUTER-READABLE MEDIUM AND APPARATUS

CROSS-REFERENCE TO RELATED APPLICATION

This application is based upon and claims the benefit of priority of the prior Japanese Patent Application No. 2013-109629, filed on May 24, 2013, the entire contents of which are incorporated herein by reference.

FIELD

The embodiment discussed herein is related to a system, a method, a computer-readable medium and an apparatus.

BACKGROUND

Data generated by sensors and devices is used by various applications. Examples of data generated by sensors include sensing data such as temperature, humidity, water level, wind speed, electric power consumption, position information, and so forth. On the other hand, examples of data generated by devices include sales data from point-of-sale (POS) terminals and vending machines, various types of correlation data such as weather and so forth at the point that a product was sold, data on the operating state of a device, stock data on products, and so forth. Data generated by sensors and devices are great both in amount and variety, and further the amount of data increases over time. Data is transmitted over a network to a data center or the like, for example, to accumulate the great amount of data generated periodically by sensors and devices. Data accumulated in the data center is transferred via network to locations corresponding to various applications which use this data, as these applications are executed.

Now, there known is a technique in which stream data is accumulated in data accumulating devices fixedly assigned by multiple data accumulating devices so as to be used. There is also known a technique in which the speed of processing for generated compressed data to be further recompressed is increased, in order to reduce the amount of communication at the time of generating information from multiple devices. There is further known a technique in which files, which have to be saved for a predetermined amount of time even though the frequency of usage is small, from the perspective of compliance and so forth, are relocated from an expensive hard disk drive to an inexpensive hard disk drive when usage frequency becomes low. Moreover, there is known a technique to extract difference of log files.

The aforementioned related art is described in, for example, Japanese Laid-open Patent Publication No. 2008-294774, International Publication Pamphlet No. 2008/105406, Japanese Laid-open Patent Publication No. 2008-071035, and Japanese Laid-open Patent Publication No. 2010-257330.

SUMMARY

According to an aspect of the invention, a system includes a terminal apparatus configured to generate pieces of data, each of the pieces of data including time information indicating when each of the pieces of data is generated; a destination apparatus configured to accumulate the pieces of data; a relay apparatus configured to store the pieces of data transmitted from the terminal apparatus based on the time information and to relay the pieces of data to the destination apparatus; and a processing apparatus configured to acquire the pieces of data that are stored in the relay apparatus and to process the pieces of data, wherein the relay apparatus is configured to store an amount of the pieces of data in the relay apparatus based on the time information, the amount corresponding to an amount of data that the processing apparatus processes based on a time range of the pieces of data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

First, the present inventors have found, through study, that in a case where data generated by terminals is collected over a network, if the data is accumulated in a manner unrelated to the placement of relay devices in the network, which a processing device accesses to use this data, there is an increase in delay time for the processing device to acquire the data.

In a later-described embodiment, the delay time for the processing device to acquire the data may be reduced in a system where data generated by terminals is delivered to a data center.

Figure 1:
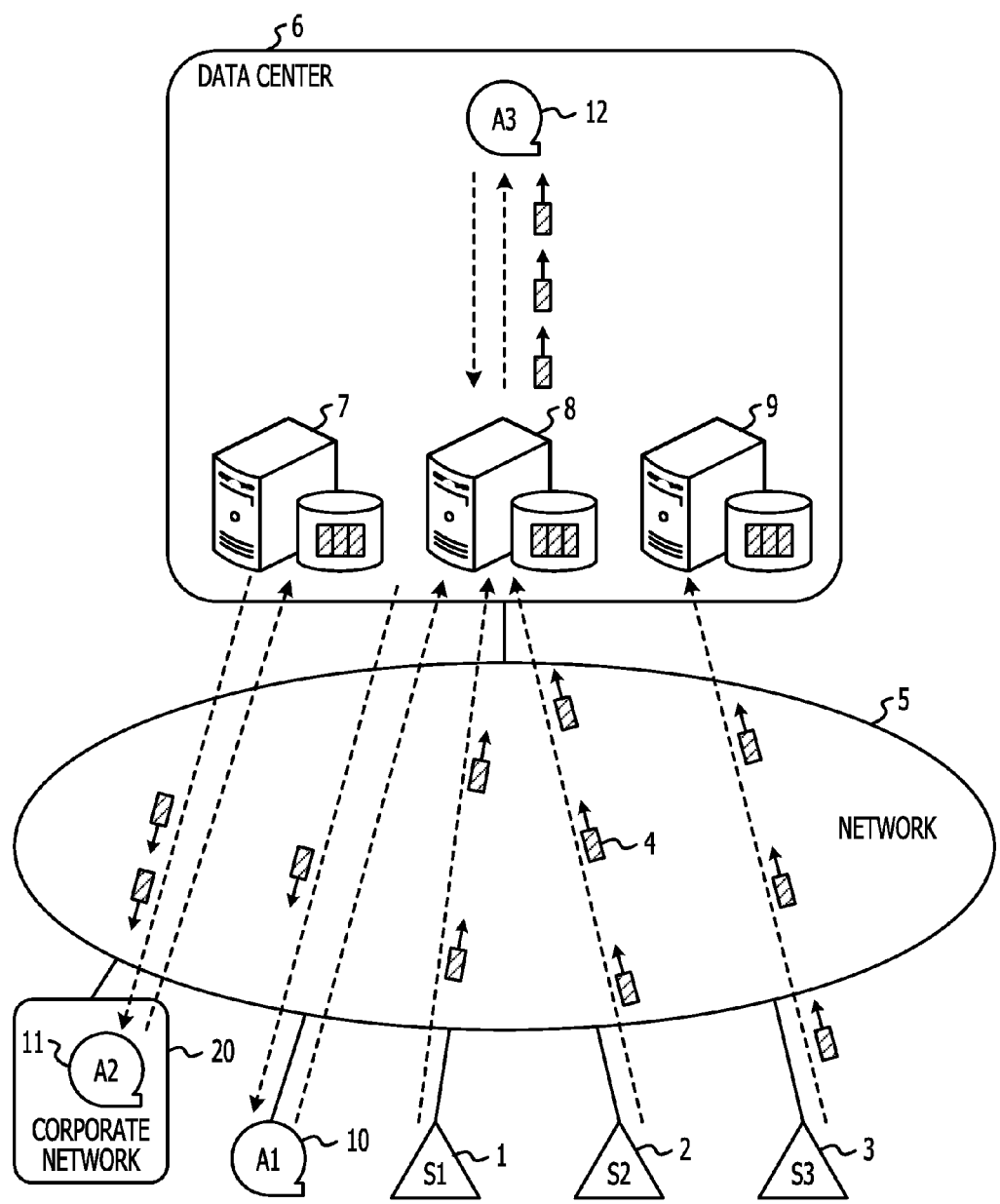
FIG. 1 is an example of a communication system.

FIG. 1 illustrates an example of a communication system. Data 4 and the like, periodically generated by sensors 1 through 3, is transferred to a data center 6 over a network 5, and accumulated in databases of servers 7 through 9 situated within the data center 6, by the communication system illustrated in FIG. 1. The data accumulated in the data center 6 is transferred to data usage terminals 10 through 12 which execute applications by this communication system, and used. Note that in FIG. 1, not all data generated by the sensors 1 through 3 and data used by the data usage terminals 10 through 12 are labeled. However, these are also indicated by hatched rectangles, and arrows indicating the direction of transfer, the same as with the data 4.

The problem studied by the present inventors in a case of assuming the communication system illustrated in FIG. 1 being used will be described later.

Data usage terminals which use the data generated by the sensors 1 through 3 may be included in a data center 6 where servers 7 through 9 to accumulate data have been installed, as with the case of the data usage terminal 12, but there are cases where the data usage terminal is not included in the data center 6. For example, the data usage terminal 10, or the data usage terminal 11 included in a corporate network 20 are not included in the data center 6, and use data generated by the sensors 1 through 3 via the network 5.

For example, the data usage terminal 12 situated within the data center 6 acquires tendencies in change of data, extracts features in the region where the sensors 1 through 3 are installed, performs analysis for product development, and so forth, using the data generated over the past one month by each of the sensors 1 through 3. On the other hand, the data usage terminal 10 is a data usage terminal which a field worker who performs work relating to the sensor 1 uses. The data usage terminal 10 acquires the newest data which the sensor 1 has generated, and this data is used to immediately handle work which occurs relating to the sensor 1. Also, the data usage terminal 11 situated within the corporate network 20 uses the past one day worth of data generated by each of the sensors 1 and 2, for example, to tabulate sales and stock of the region covered by the sensors 1 and 2, make product manufacturing plans, and so forth.

Thus, activities and analysis are performed for a business providing services, using the data center provided thereto, but it may be that not all functions and devices for other operations, work, activities, and analysis thereof relating to the business, are collected in the data center. Operations, work, activities, and analysis thereof relating to the business, are performed at locations other than the data center as well. For example, an application which provides functions for various types of operations, work, activities, and analysis thereof relating to the business, acquires data and information generated by sensors and the like used for the business over a network, and use these. The results of the application are received through the data usage terminal. Thus, activities to continue the business are ceaselessly being carried out at various locations.

Furthermore, the data generated by the sensors, is used at various geographical locations, and there are various geographical ranges which the applications handle. Moreover, there are various points-in-time of generating of data, periods, and so forth, of data which the applications handle.

Accordingly, in a case where the accumulation location of data generated by the sensors, and the data usage terminals using the data, are geographically far apart, the delay time from an application used at a data usage terminal requesting access to the data, to being able to use the data, becomes great.

For example, in the case that the data usage terminal 10 and data center 6 illustrated in FIG. 1 are geographically far apart, time for the data usage terminal 13 to acquire data from the data center 6, for example, is great due to dependency on data transfer time from the data center 6, since the data generated by the sensors 1 through 3 has been temporarily accumulated in the data center 6. Additionally, the communication resources within the network 5 are frequently used to transfer the data from the data center 6 to the data usage terminal 10, thus increasing the traffic amount within the network 5. Also, a making a copy of the same data accumulated in the data center 6 and accumulating this near the data usage terminal at the geographically remote location to reduce the increase in delay time and traffic amount means that a storage capable of accumulating the massive copies of data generated by the sensors 1 through 3 has to be provided to the communication system.

Figure 2:
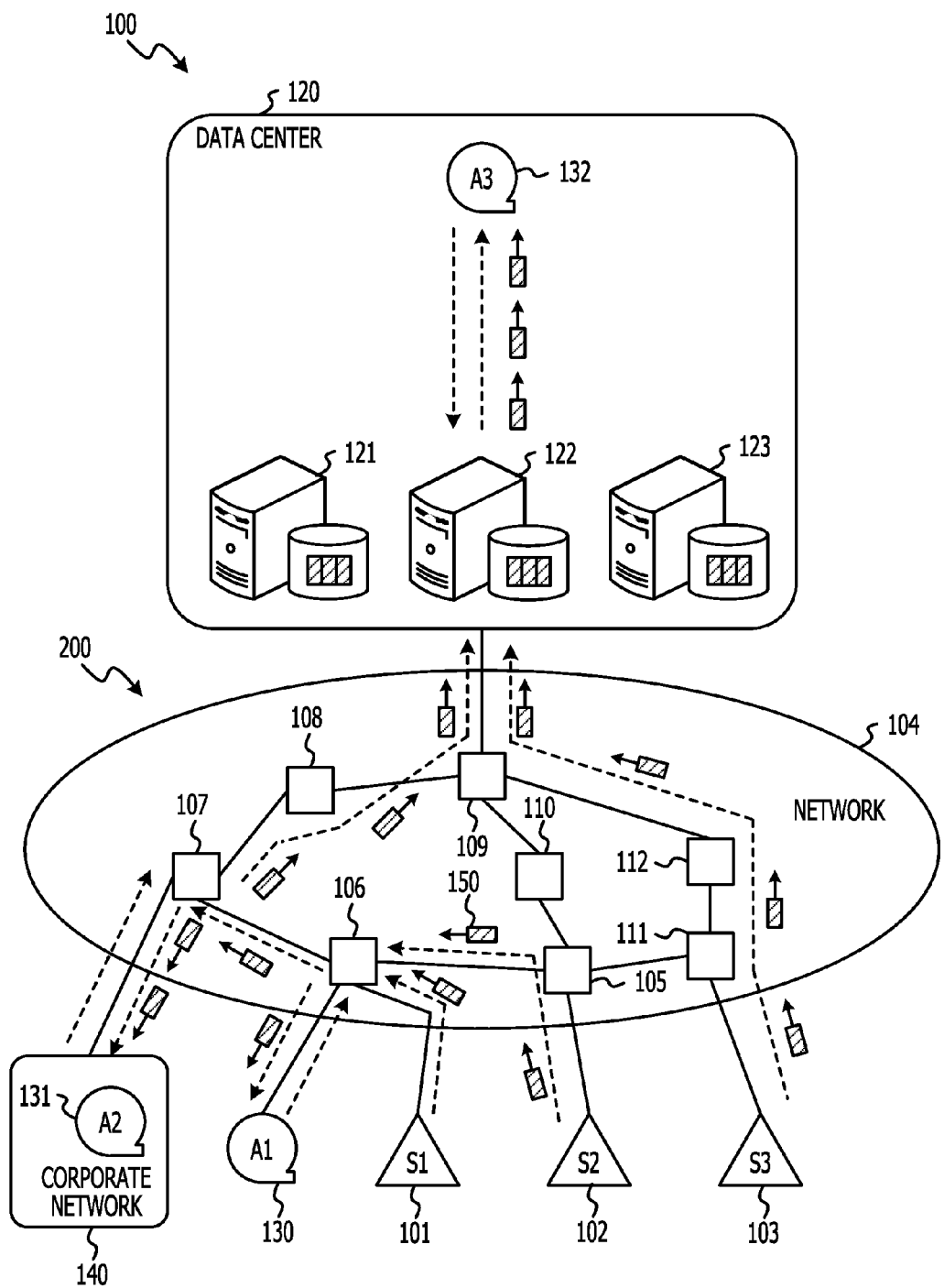
FIG. 2 is an example of a business management system according to an embodiment.

FIG. 2 is an example of a business management system according to an embodiment. The business management system 100 illustrated in FIG. 2 has a communication system 200 including relay devices 105 through 112 included in a network 104. The business management system 100 also has terminals 101 through 103 which collect information at predetermined cycles and generate data based on the information (hereinafter also referred to as "data generating source terminal"), a data center 120 including servers 121 through 123, and data usage terminals 130 through 132 (or simply "data usage terminal") which use the data generated by the data generating source terminals 101 through 103. The data usage terminal 130 executes an application A1 for at least one of operations, work, activities, and analysis thereof, relating to the business which manages and provides the service using the data center 120. The data usage terminal 130 acquires data generated by the data generating source terminals 101 through 103 from the relay device 106, to use when the application A1 is being executed. The data usage terminal 131 executes an application A2 for at least one of operations, work, activities, and analysis thereof, relating to the business which manages and provides the service using the data center 120. The data usage terminal 131 acquires data generated by the data generating source terminals 101 through 103 from the relay device 107 via the corporate network 140, to use when the application A2 is being executed. The data usage terminal 132 exists within the data center 120, and uses resources within the data center 120 to execute an application A3 for at least one of operations, work, activities, and analysis thereof, relating to the business which manages and provides the service using the data generating source terminals 101 through 103. The data usage terminal 131 acquires data generated by the data generating source terminals 101 through 103 from servers 121 through 123, to use when the application A3 is being executed. Note that FIG. 2 exemplarily illustrates a system of the embodiment, and that embodiments are not to be interpreted restrictively by the configuration, numbers, and so forth illustrated in FIG. 2.

The data generating source terminals 101 through 103 are sensor devices for example, and a provided for the business which manages and provides the service using the data center 120. The data generating source terminals 101 through 103 collect information at predetermined cycles. The data generating source terminals 101 through 103 then add identifiers to the collected information to identify the data generating source terminal, and add generated point-in-time indicating the point-in-time at which the information was collected, thereby generating data. This generated data is transmitted to a relay device to which the data generating source terminals 101 through 103 are connected. Examples of data generated by sensors include sensing data such as temperature, humidity, water level, wind speed, electric power consumption, position information, and so forth, which are periodically measured. On the other hand, examples of data generated by devices include sales data from point-of-sale (POS) terminals and vending machines, various types of correlation data such as weather and so forth at the point that a product was sold, stock data on products, and so forth. Note that the data generating source terminals 101 through 103 may generate data by collecting information each type a predetermined cycle elapses, or may collect information periodically at predetermined cycles, and generate data based on the information during this period, so as to be transmitted at predetermined cycles.

The data generated by the data generating source terminals 101 through 103 is acquired by the data usage terminals 130 through 132, and used by applications A1 through A3 executed at the data usage terminals 130 through 132. The data usage terminals 130 through 132 specify an identifier identifying the data generating source terminals 101 through 103, and the generated point-in-time, to acquire the data to be used.

For example, let us say that data 150 generated by the data generating source terminal 102 is transmitted to the relay device 106 via the relay device 105 as illustrated in FIG. 2. The reason that the relay device 105 transmits the data 150 to the relay device 106 rather than to the relay device 110 is thus. In the embodiment, the transfer target of the data generated by the data generating source terminal 102 is set to the relay device 106, to which is connected the data usage terminal 130 that uses the data 150, which will be described later. The application A1 executed at the data usage terminal 130 then specifies the identifier identifying the data generating source terminal and the generated point-in-time to acquire the data 150 from the relay device 106. Note that in FIG. 2, not all data generated by the data generating source terminals 101 through 103 and data used by the data usage terminals 130 through 132 are labeled. However, these are also indicated by hatched rectangles, and arrows indicating the direction of transfer, the same as with the data 150.

The relay device 106 accumulates the received data for a predetermined accumulation time and the relocates this data to the transfer target, following a set rule, according to the embodiment. For example, the relay device 106 which has received the data 150 stores the data 150 for a time range during which the data usage terminal 130 connected to the relay device 106 uses the data 150 generated by the data generating source terminal 102. In a case where the data 150 is not to be used by the data usage terminal 130, the accumulation time is set to 0 for example, so the relay device 106 transfers the data 150 to the relay device 107 without accumulating the data 150. This rule also stipulates regarding data generated by which data generating source terminal is to be accumulated, for example, which will be described in detail later. That is to say, the relay device 106 has rules set for each data generating source terminal 101 and 102. For example, the data usage terminal 130 uses data generated by the data generating source terminal 101 every certain period, so data generated by the data generating source terminal 101 is accumulated for a predetermined accumulation period and then transferred to the relay device 107.

The relay device 107 which has received the data 150 and so forth accumulates the data 150 and the like during the time range in which the data usage terminal 131 connected to the relay device 107 will use the data 150 or the like, and then transfers the data 150 and the like to the relay device 108. The transfer of data 150 and the like at this time may be performed following rules different from the rules set to the relay device 106. For example, let us say that the data usage terminal 130 situated near the data generating source terminal 101 is a data usage terminal which a field worker who performs work relating to the data generating source terminal 101 uses, and acquires the newest data which the data generating source terminal 101 has generated and immediately notify of what work has to be performed. Let us also say that the data usage terminal 131 situated within the corporate network 140 uses the past one day worth of data generated by each of the data generating source terminal 101 and 102, to make product manufacturing plans. These two cases are different in the time range of data usage, and also different regarding region. Accordingly, the accumulation period in the relay device and the transfer target may be appropriately set according to the geographical position and time range of the data generated by the data generating source terminals, and the object of using the data.

The data 150 and the like delivered to the relay device 108 is then delivered to the data center 120 via the relay device 109. On the other hand, the data generated by the data generating source terminal 103 is delivered to the data center 120 via the relay devices 111, 112, and 109, as illustrated in FIG. 2. Thus, the data 150 and the like delivered to the data center 120 is used by the data usage terminal 132. For example, the application A3 corresponding to the data usage terminal 132 may use the data generated over the past month by each of the data generating source terminals 101 through 103 to acquire tendencies in change of data, extract features in the region where the data generating source terminals 101 through 103 are installed, perform analysis for product development, and so forth.

As described above, according to the embodiment, in a case where applications A1 through A3 executed on data generating source terminals 101 through 103 use data of different time ranges from different locations, the relay device where data is to be accumulated is changed in accordance with elapse of time after the data has been generated. Thus, the data which the applications A1 through A3 want to acquire from a relay device or server may be accumulated in a nearby relay device or server. Details of the embodiment will be described later.

Figure 3:
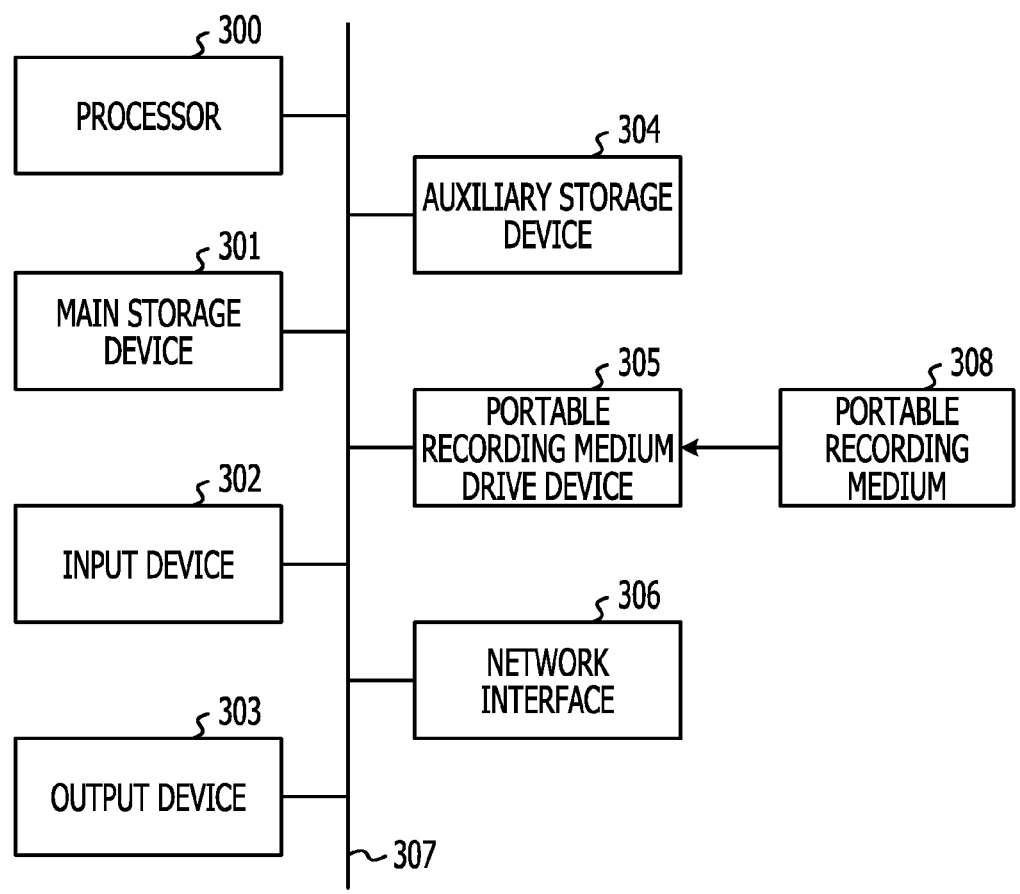
FIG. 3 is an example of a hardware configuration of a relay device and data position management device according to the embodiment.

FIG. 3 is an example of a hardware configuration of a relay device and data position management device according to the embodiment. The relay devices 105 through 112 and a data position management device 600 are each a dedicated computer serving as a server, or a general-purpose computer. The relay devices 105 through 112 and the data position management device 600 each include a processor 300, a main storage device 301, an input device 302, an output device 303, an auxiliary storage device 304, a portable recording medium drive device 305, and a network interface 306. These components are mutually connected by a bus 307.

The processor 300 is a central processing unit (CPU), for example. The processor 300 loads an operating system (OS) and various types of application programs stored in the auxiliary storage device 304 or a portable recording medium 308 to the main storage device 301, and executes these. The number of processors 600 is not restricted to one, rather, multiple processors 600 may be provided.

The main storage device 301 is used to provide a storage area or work area to load programs stored in the auxiliary storage device 304 to, or as a buffer, or the like, for the processor 300. The main storage device 301 is semiconductor memory such as random access memory (RAM), for example.

The input device 302 is a keyboard, pointing device such as a mouse, or the like, for example. Data input from the input device 302 is transferred to the processor 300. The output device 303 outputs the results of processing performed by the processor 300. The output device 303 includes an audio output device such as a speaker or the like, a display, printer, and so forth.

The auxiliary storage device 304 stores various types of programs, and also data which the processor 300 uses at the time of executing the programs. The auxiliary storage device 304 is non-volatile memory, examples of which include erasable programmable ROM (EPROM), a solid state drive (SSD), and a hard disk drive. The auxiliary storage device 304 also stores an operating system (OS), data accumulation destination deciding programs, and various other application programs.

The portable recording medium drive device 305 reads out the programs and various types of data recorded in the portable recording medium 308, and outputs this to the processor 300. The portable recording medium 308 is a recording medium, examples of which include SD cards, mini SD cards, micro SD cards, universal serial bus (USB) flash memory, compact discs (CD), digital versatile discs (DVD), Blu-ray Discs, flash memory cards, and so forth.

The network interface 306 is an interface which performs input/output of information from/to the network. Network interfaces include interfaces which connect to a cabled network, and interfaces connecting to a wireless network, examples of which include a network interface card (NIC), wireless local area network (LAN) card, and so forth. Data received by the network interface 306 is transferred to the processor 300.

Figure 4:
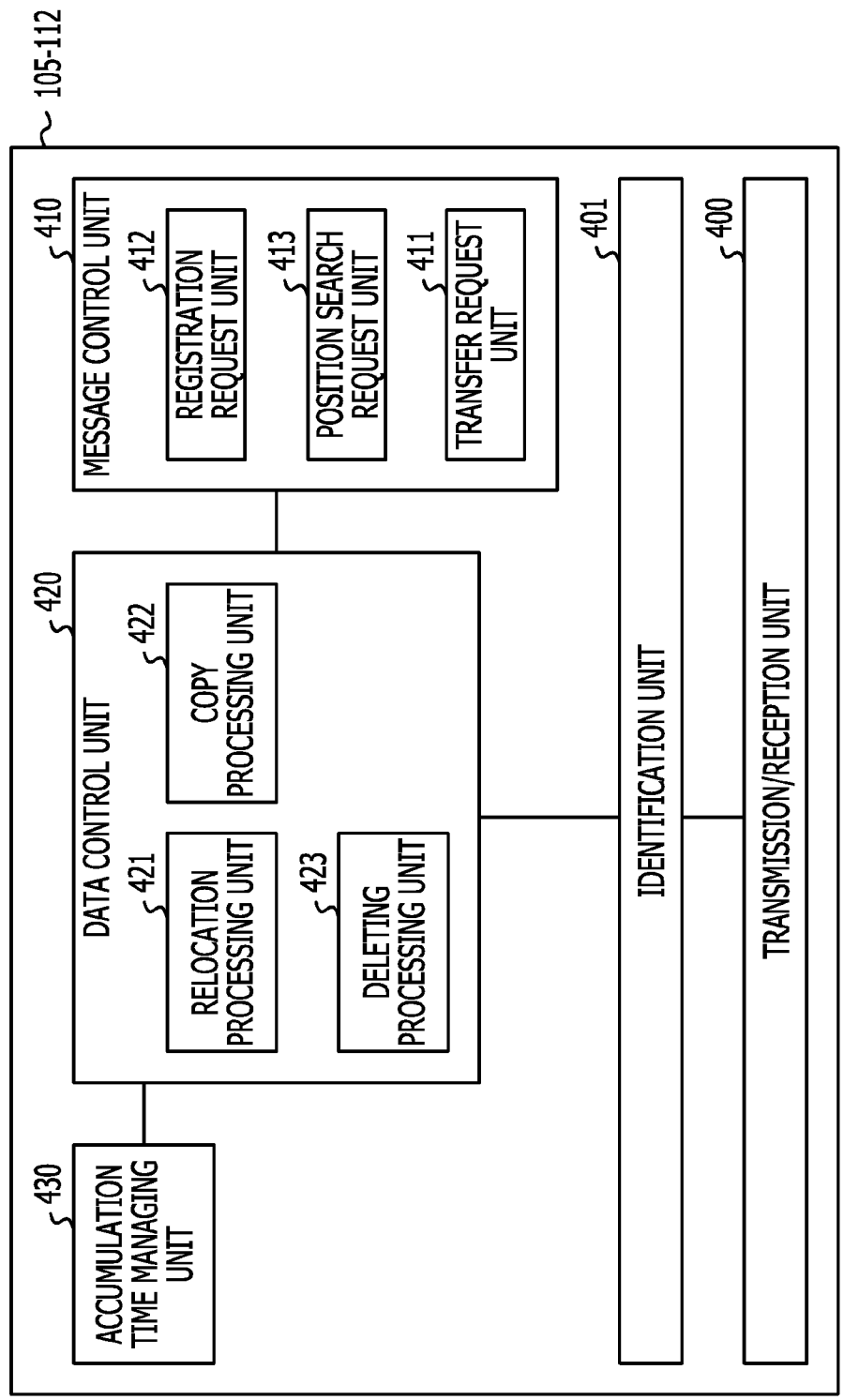
FIG. 4 is an example of a functional block of the relay device according to the embodiment.

FIG. 4 is an example of a functional block of the relay device according to the embodiment. The later-described function blocks are executed by the processor 300 illustrated in FIG. 3 executing programs stored in the main storage device 301 of the relay devices 105 through 112. Note that a transmission/reception unit 400 is realized by the network interface 306 illustrated in FIG. 3. The processing executed by each functional block will be described in the description of FIGS. 24 through 29.

The transmission/reception unit 400 transmits message packets including data and control messages over the network, with data generating source terminals, data usage terminals, other relay devices, and the data position management device 600. Message packets include a Layer 2 header corresponding to the communication line and an IP/TCP/HTTP header and HTTP body. The HTTP body includes data values generated by the data generating source terminals, identifiers, content of control messages (for example, position registration request and position registration response) and so forth.

An identification unit 401 analyzes the header and body of message packets received from the transmission/reception unit 400, and performs operations such as identifying message packet type, and extracting an identifier of the terminal or device which is the message transmission source. Types of messages include data transmission from a data generating source terminal, a data acquisition request from a data usage terminal, data transfer or a data transfer request from another relay device, position registration response or position search request from the data position management device 600. In a case where the message type is data transmission from a data generating source terminal, the identification unit 401 searches accumulation rules based on the identifier of the data generating source terminal that has been extracted, and confirm whether or not the data generating source terminal is an object of accumulation.

Note that accumulation rules are information stored in the main storage device 301 or auxiliary storage device 304 illustrated in FIG. 3, and include identifiers of data generating source terminals, accumulation periods, and identifiers of relay devices to which data is to be relocated after the accumulation period elapses. Also, in a case of relocating a copy of data to another relay device at a scheduled point-in-time, the scheduled point-in-time at which to transmit the copy is also included. Further, in addition relocating data, specified actions are included to perform control such as copy, delete, overwrite, and so forth. The relay devices judge, based on the accumulation rules, which data generating source terminal's data to be accumulated for how long in which relay device. Specific examples will be described layer.

A transfer request unit 411 requests another relay device for transfer of data which the relay device itself does not have accumulated therein, and in a case where the requested data has been transferred from another relay device, transmits to the data usage terminal which is the data acquisition requesting source via the transmission/reception unit 400.

An accumulation time managing unit 430 manages the amount of time elapsed since starting accumulating, for each data accumulated, based on the accumulation period indicated in the accumulation riles. Management of accumulation time may be performed by a method of storing the point-in-time of the accumulation start time and checking the amount of time elapsed till the current point-in-time. Alternatively, management of accumulation time may be performed by a method of calculating and storing the accumulation end predicted point-in-time from the point-in-time of the accumulation start time of each data, and checking whether or not the current point-in-time is later than the accumulation end predicted point-in-time.

A data control unit 420 performs processing of data operations such as accumulation of data, relocating of data, creating copies of data, deleting data, and so forth, based on the accumulation rules and accumulation time management. The data control unit 420 also searches for and acquires accumulated data, based on data acquisition requests from data usage terminals.

In a case of performing a request to another relay device or data position management device 600, a message control unit 410 generates various types of request messages to be transmitted via the transmission/reception unit 400, and also receives response messages or transferred data in response to the transmitted request message from another relay device or data position management device 600.

In the case of having accumulated, relocated, or deleted data, a position registration request unit 412 transmits a position registration request message to the data position management device 600. The position registration request message includes the identifier of the data generating source terminal, the point-in-time of generating the accumulated data or the range thereof, and an identifier of the relay device itself. A position registration response message may be received from the data position management device 600 as a response.

At the time of receiving a data acquisition request from a data usage terminal, a position search request unit 413 transmits a position search request message to the data position management device 600 to request searching of an accumulation target relay device for the data the relay device has not accumulated itself. Also, the position search request unit 413 receives a position search response message including search results from the data position management device 600.

Figure 5:
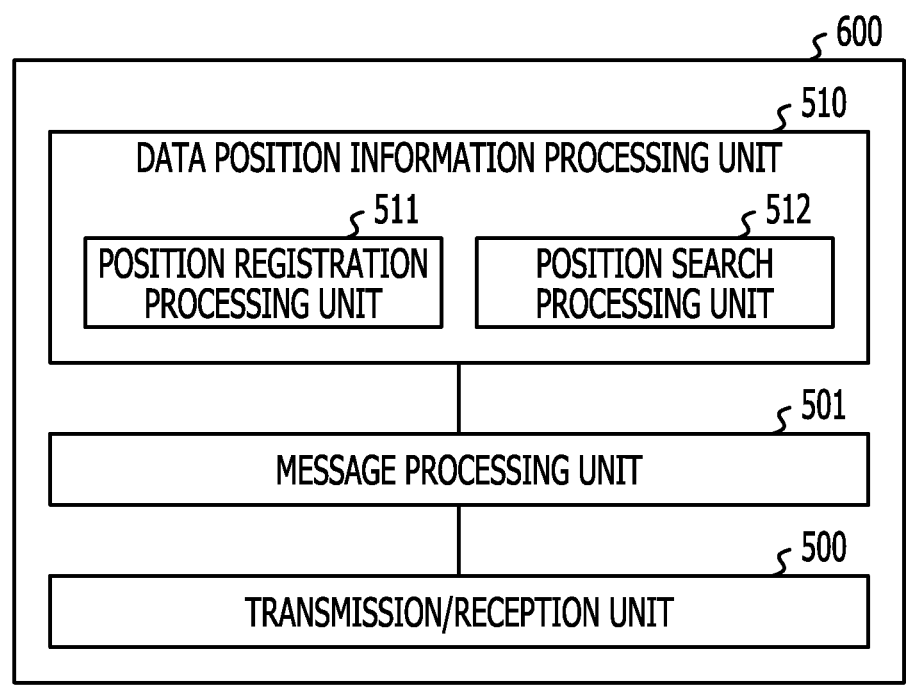
FIG. 5 is an example of a functional block of the data position management device according to the embodiment.

FIG. 5 is an example of a functional block of the data position management device according to the embodiment. In the data position management device 600, the later-described function blocks are executed by the processor 300 illustrated in FIG. 3 executing programs stored in the main storage device 301. Note that a transmission/reception unit 500 is realized by the network interface 306 illustrated in FIG. 3. The processing executed by each functional block will be described in the description of FIGS. 30 through 31.

The transmission/reception unit 500 transmits message packets including data and control messages via the relay devices 105 through 112 and the network. Message packets include a Layer 2 header corresponding to the communication line and an IP/TCP/HTTP header and HTTP body. The HTTP body includes content of control messages (for example, position registration request and position registration response) and so forth. Alternatively, remote procedure calls may be performed between the relay devices 105 through 112 and the data position management device 600 using the Thrift protocol, instead of the HTTP protocol.

A message processing unit 501 analyzes the header and body of message packets received at the transmission/reception unit 500, identifies the type of message packet (position registration request or position search request from a relay device), extracts an identifier of the relay device which is the message transmission source, and requests a position registration processing unit 511 or position search processing unit 512 to perform the processing of position registration or position searching. Further, the message processing unit 501 generates a response message based on the results of the position registration or position search at the position registration processing unit 511 or position search processing unit 512, and transmits this response message to the relay device of the requesting source relay device via the transmission/reception unit 500.

Based on position registration requests from the relay devices 105 through 112, the position registration processing unit 511 uses identifiers of data generating source terminals, the point-in-time of generating data or the period thereof, identifiers of relay devices accumulating data, and so forth, in data position information, to register, update, delete, or the like, the data. Note that data position information is information in which an identifier of a data generating source terminal, the point-in-time of generating data or the period thereof, an identifier of a relay devices accumulating data, and so forth, have been correlated with each other.

The position search processing unit 512 references data position information based on position search requests for the relay devices 105 through 112, to extract the identifier of a relay device accumulating data to be searched for, indicated by the data generating source terminal and the point-in-time of generating the data or the period thereof.

Figure 6:
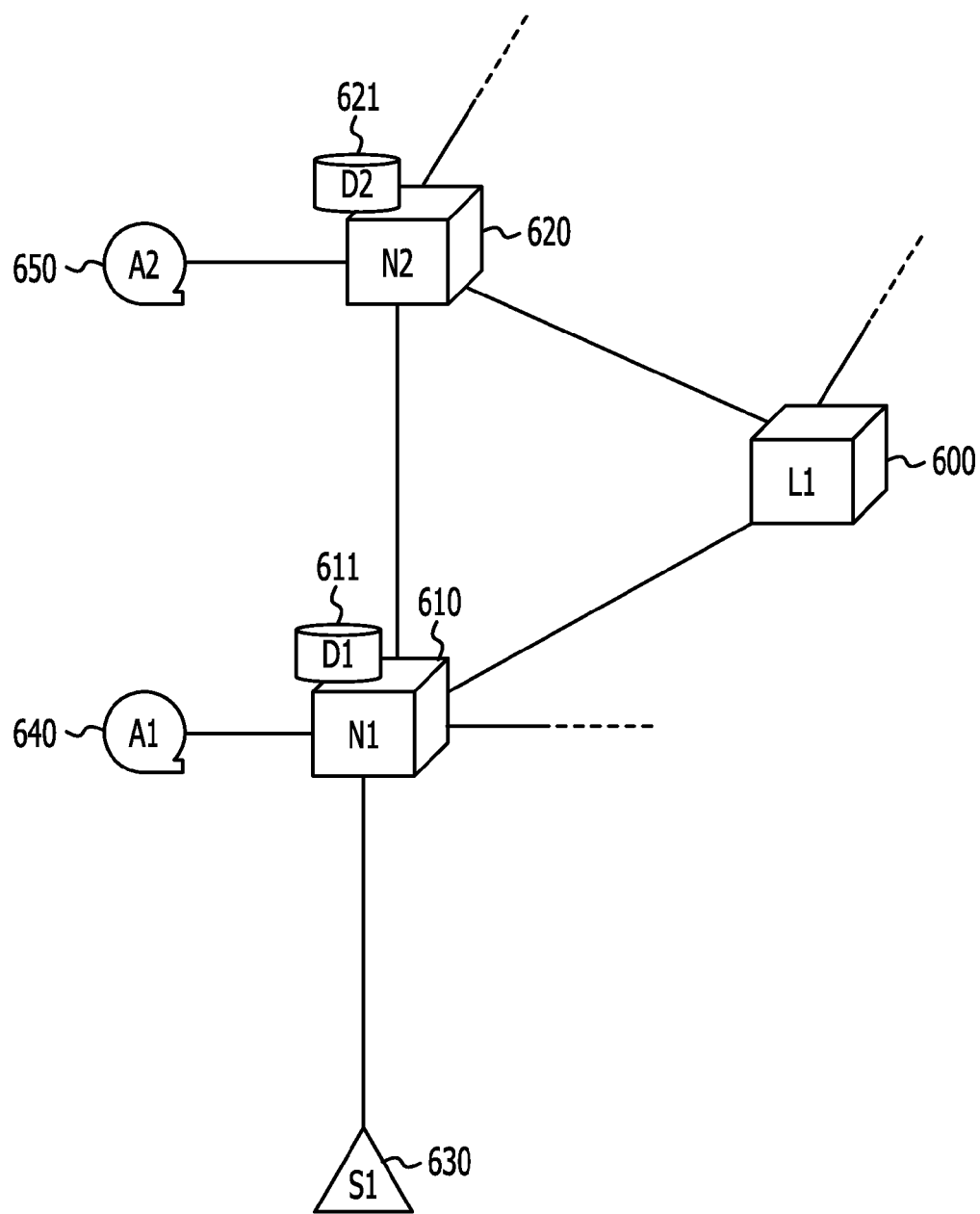
FIG. 6 is an example of a communication system having relay devices according to the embodiment.

FIG. 6 is an example of a communication system having relay devices according to the embodiment. The communication system illustrated in FIG. 6 is a part of the communication system 200 illustrated in FIG. 3 which has been extracted for description, in which the relay device 106, relay device 107, and data position management device 600 (hereinafter also written as "management device") are illustrated. The relay device 106, the relay device 107, and the data position management device 600, are connected by a cable or wireless network. Note that the data position management device 600 may be realized by servers 121 through 123 and so forth situated within the data center 120 for example, or may be realized by servers other than the data center 120. Further, the communication system 200 may be defined without including the data position management device 600.

Further, the data generating source terminal 101 which generates data is connected to the relay device 106 via cable or wireless network, as illustrated in FIG. 6. The relay device 106 and relay device 107 receive or transmit data generated by the data generating source terminal 101 over the network, and also store this data in storages D1 and D2 as accumulated data, using the main storage device 301 or auxiliary storage device 304 of each.

Further, the data usage terminals 130 and 131 which use the data generated by the data generating source terminal 101 are each connected to the respective relay devices 106 and 107 by cable or wireless network, as illustrated in FIG. 6. More specifically, applications A1 and A2 which are executed at the data usage terminals 130 and 131 use the data generated by the data generating source terminal 101 to perform processing.

Figure 7:
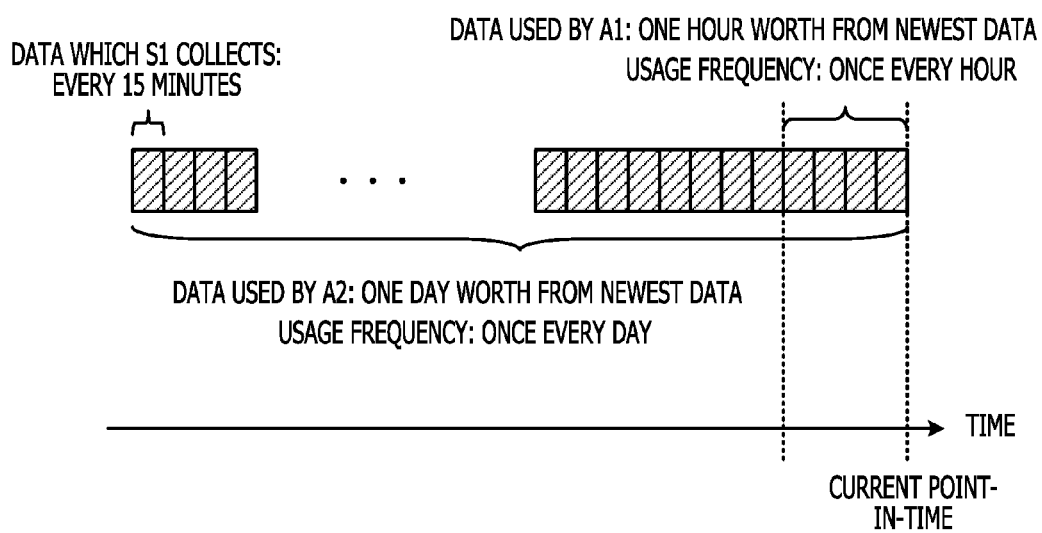
FIG. 7 is an example of data used by an application.

FIG. 7 is an example of data used by an application. Illustrated in FIG. 7 is an example of time range of data of the data generating source terminal 101 to be used by each of the applications A1 and A2 in FIG. 6. Note that in the example illustrated in FIG. 7, the data generating source terminal 101 generates sensor data every 15 minutes, and each data generated every 15 minutes is represented by a hatched rectangle.

The application A1 uses, of the data generated by the data generating source terminal 101, data within the time range of one hour from the newest data (equivalent to four rectangles of data), at a frequency of once an hour. On the other hand, the application A2 uses, of the data generated by the data generating source terminal 101, data within the time range of one day from the newest data (equivalent to 96 rectangles of data), at a frequency of once a day. Note that the time range of the data which the applications A1 and A2, and the frequency of usage, may be the same or may be different. For example, there may be an application which uses, of the data generated by the data generating source terminal 101, the newest data at a frequency of once an hour, or there may be an application which uses data within two hours of the newest data at a frequency of once an hour.

According to the example in FIG. 7, both applications A1 and A2 use, of the data generated by the data generating source terminal 101, data included in a range of one hour after being generated. On the other hand, data which has passed one hour after having been generated is not used by the application A1, but has not yet been used by the application A2 and will be used within the remaining 23 hours at the latest.

According to the embodiment, the fact that there is difference in the time range of data which each application may use is taken advantage of. Data which an application having a short time range of using data has finished using is relocated beforehand to a relay device which an application having a longer time range accesses, so that the latter application may acquire the data to be used with a smaller transfer delay when using the data. This is control of accumulation location of data, and operation examples thereof will be described later.

Figure 8:
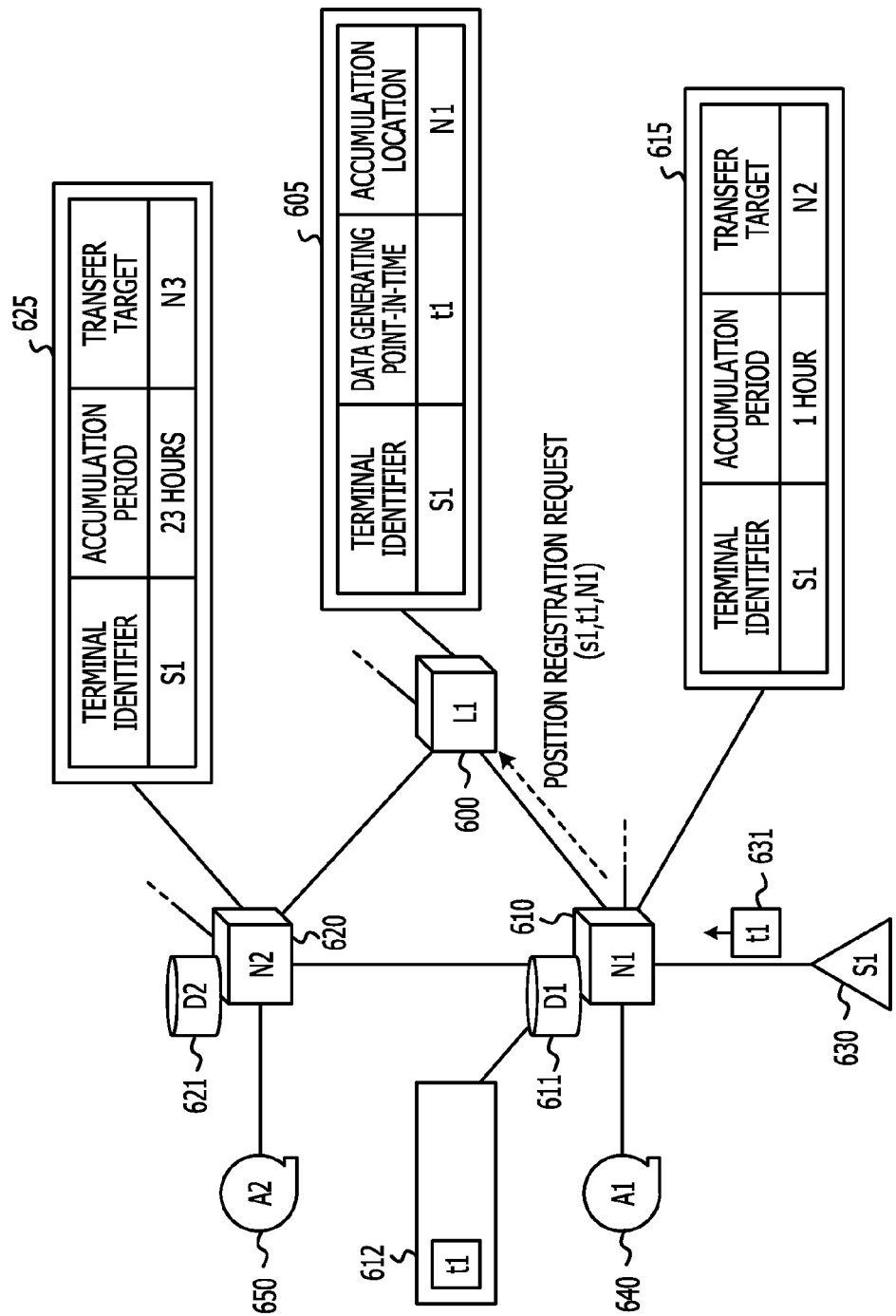
FIG. 8 is an example of a case in which data generated by terminals is accumulated by the relay devices according to the embodiment.

FIG. 8 is an example of a case in which data generated by terminals is accumulated by the relay devices according to the embodiment. The example in FIG. 8 illustrates that at the time of data generated by the data generating source terminal 101 being relayed, the data is first accumulated in the relay device 106.

The data generating source terminal 101 generates sensor data at point-in-time t1, and transmits the data to the relay device 106 over the network. The data being transmitted includes, besides the sensed information itself, an identifier S1 to identify the data generating source terminal 101, and information representing the point-in-time t1 at which the data was generated. Note that data generating point-in-time may appended by the data generating source terminal itself, or alternatively the relay device 106 may manage the point-in-time at which the data was received from the data generating source terminal 101 as the data generating point-in-time. Transmission of data from the data generating source terminal 101 to the relay device 106 may be performed using TCP/IP and HTTP, which are communication protocols commonly used on the Internet, for example. The data generating source terminal 101 may, for example, use an HTTP POST request message to transmit the data, terminal identifier, and data generating point-in-time to the relay device 106.

Upon receiving a message including data, the relay device 106 extracts the terminal identifier, and identifies the data generating source terminal. The relay device 106 then references the accumulation rules to extract the data accumulation rules for the identified terminal.

FIG. 8 exemplarily illustrates that in an accumulation rule 615 regarding the data generated by the data generating source terminal 101 stipulates that the accumulation period is one hour and the transfer target relay device is the relay device 107. The accumulation rule 615 uses an identifier N2 to identify the relay device 107, thereby identifying that the transfer target relay device is the relay device 107. The relay device 106 extracts the data and terminal identifier S1 and generating point-in-time t1, and starts accumulation at storage 611 used as a database in accordance with the accumulation rule 615. Note that FIG. 8 illustrates data generated by the data generating source terminal 101 being accumulated in the storage 611 as accumulation data 612.

Also, starting accumulation of data triggers the relay device 106 to make a position registration request to the data position management device 600 for the data being accumulated. This position registration request includes the terminal identifier S1, generating point-in-time t1, and identifier N1 to identify the relay device 106.

The data position management device 600 registers the entries of terminal identifier S1, generating point-in-time t1, and the relay device 106, in data position information 605 which it manages, based on the position registration request received from the relay device 106. The data position management device 600 may return a response message to the relay device 106 which is the requesting source, as notification that the position registration has been completed, though this is omitted from illustration in FIG. 8.

Figure 9:
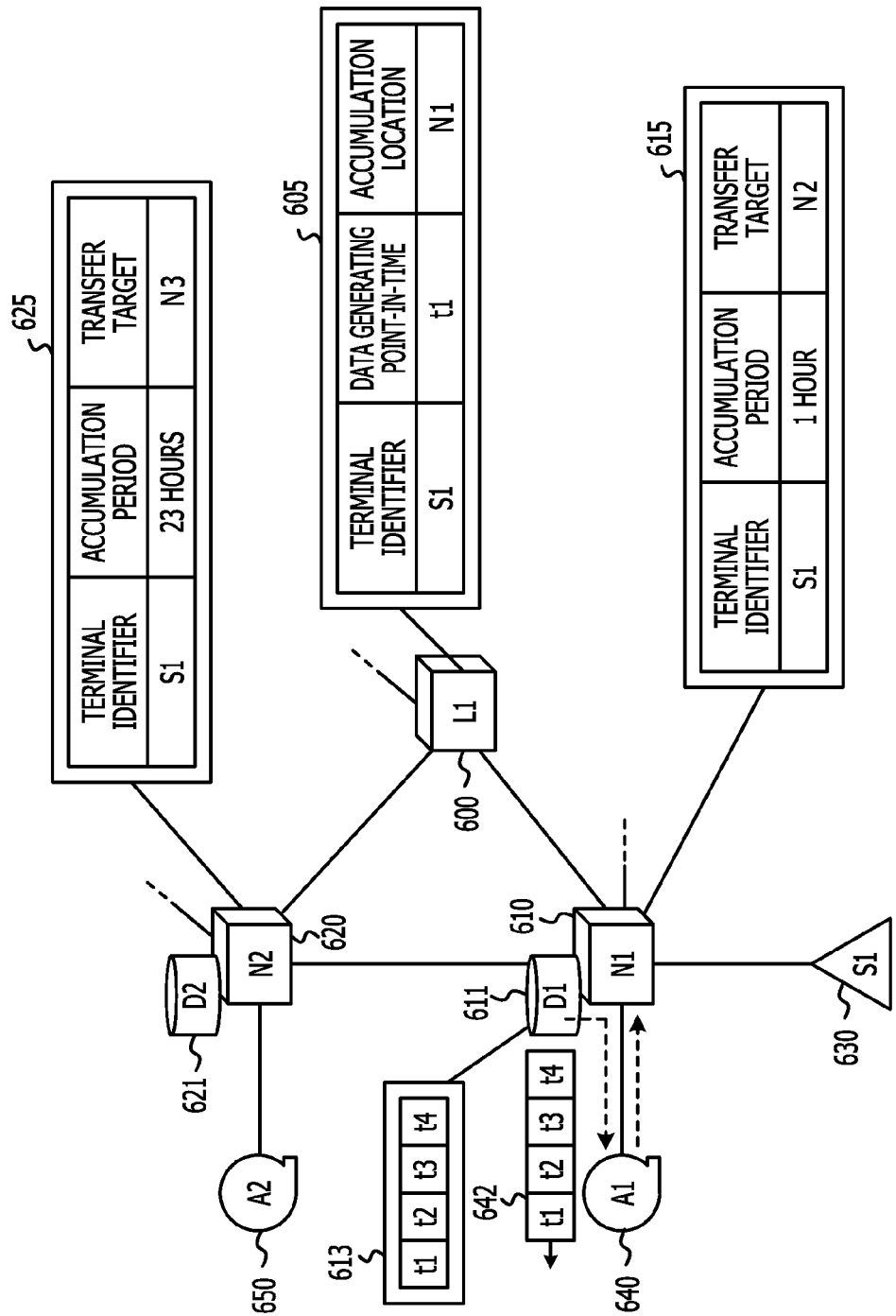
FIG. 9 is an example of a case in which data accumulated by the relay devices according to the embodiment is requested.

FIG. 9 is an example of a case in which data accumulated by the relay devices according to the embodiment is requested. FIG. 9 illustrates operations which the application A1 performs to perform an acquisition request for one hour worth of data from the newest data, in a case where data is accumulated by the relay device 106 and interrupted. The relay device 106 accumulates one hour of each data received from the data generating source terminal 101, as described with reference to FIG. 8. Accordingly, the storage 611 of the relay device 106 has accumulated therein data of generating point-in-time t1 through t4.

As illustrated in FIG. 7, the application A1 uses, of the data generated by the data generating source terminal 101, data within the time range of one hour from the newest data, at a frequency of once an hour. Here, the data at point-in-time t4 is the newest, and each data is generated every 15 minutes, so the data of generating point-in-time t1 through t4 is included in the range of one hour from the newest data.

Now, upon the application A1 making an acquisition request for one hour worth of data from the newest data from the data generating source terminal 101, the relay device 106 confirms whether or not the requested data is accumulated in the storage 611. The requested data is accumulated in the storage 611, so the relay device 106 reads out the data of generating point-in-time t1 through t4 from the storage 611, and transmits the data to the application A1 which is the requesting source, as illustrated as transfer data 642. At this time, the relay device 106 may transmit the data to the application A1 in the order of t1, t2, t3, and t4, which is in order of the oldest generating point-in-time, or conversely may transmit the data in the order of t4, t3, t2, and t1, which is in order of the newest generating point-in-time.

Note that a data acquisition request from the application A1 to the relay device 106 may be performed using TCP/IP and HTTP, which are communication protocols commonly used on the Internet, for example. For example, the application A1 may use an HTTP GET request message to specify the terminal identifier and generating point-in-time of the data to be acquired, and make a data acquisition request to the relay device 106.

Figure 10:
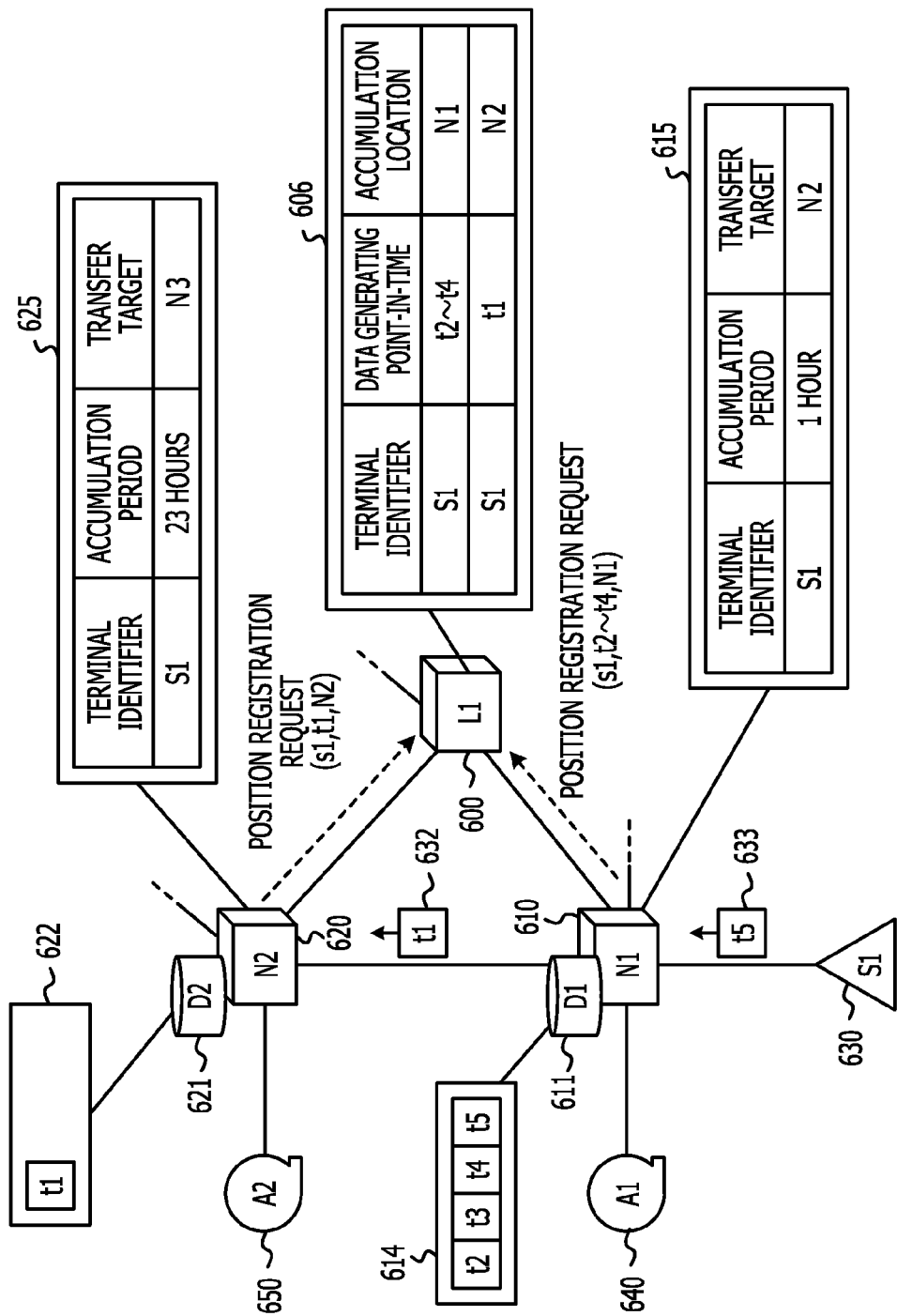
FIG. 10 is an example of a case in which data accumulated in one relay device is relocated to another relay device.

FIG. 10 is an example of a case in which data accumulated in one relay device is relocated to another relay device. The relay device 106 performs management of each data accumulated therein, regarding whether the accumulation period from the point-in-time at which accumulation was started, given in the accumulation rule 615, has elapsed. The example illustrated in FIG. 10 is an example where time has elapsed from the state illustrated in FIG. 9, and one hour has elapsed from having started accumulation of data at the generating point-in-time t1. Accordingly, the relay device 106 transfers the data at generating point-in-time t1 to the relay device 107 which is the transfer target, in accordance with the accumulation rule 615, and also deletes the data of generating point-in-time t1 from the storage 611, thereby relocating the data from the relay device 106 to the relay device 107.

Due to this data relocate, data accumulated in the storage 611 of the relay device 106 changes from the generating point-in-time t1, t2, t3, and t4, before relocating the data, to generating point-in-time t2, t3, t4, and t5, after relocating the data. Accordingly, the relay device 106 makes a position registration request again, to update the range of the generating point-in-time for the data accumulated in the relay device 106, out of the data position information 605 managed at the data position management device 600. In the position registration request made by the relay device 106, the oldest point-in-time of the generated point-in-time in the data being accumulated, which is t2, and the newest point-in-time which is t5, are indicated as the range of the generating point-in-time. The data position management device 600 updates the range of generating point-in-time of the data being accumulated in the relay device 106 for the data generating source terminal 101 from "t1 to t4" to "t2 to t5" in the data position information 605, based on the contents of the position registration request.

In the same way, starting accumulation of data triggers the relay device 107, which has received the data at generating point-in-time t1 relocated from the relay device 106, to make a position registration request to the data position management device 600 for the data being accumulated. This position registration request includes the terminal identifier S1, generating point-in-time t1, and identifier N2 to identify the relay device 107.

The data position management device 600 registers the entries of terminal identifier S1, generating point-in-time t1, and relay device identifier N2, in the data position information 605 which it manages, based on the position registration request received from the relay device 107.

Figure 11:
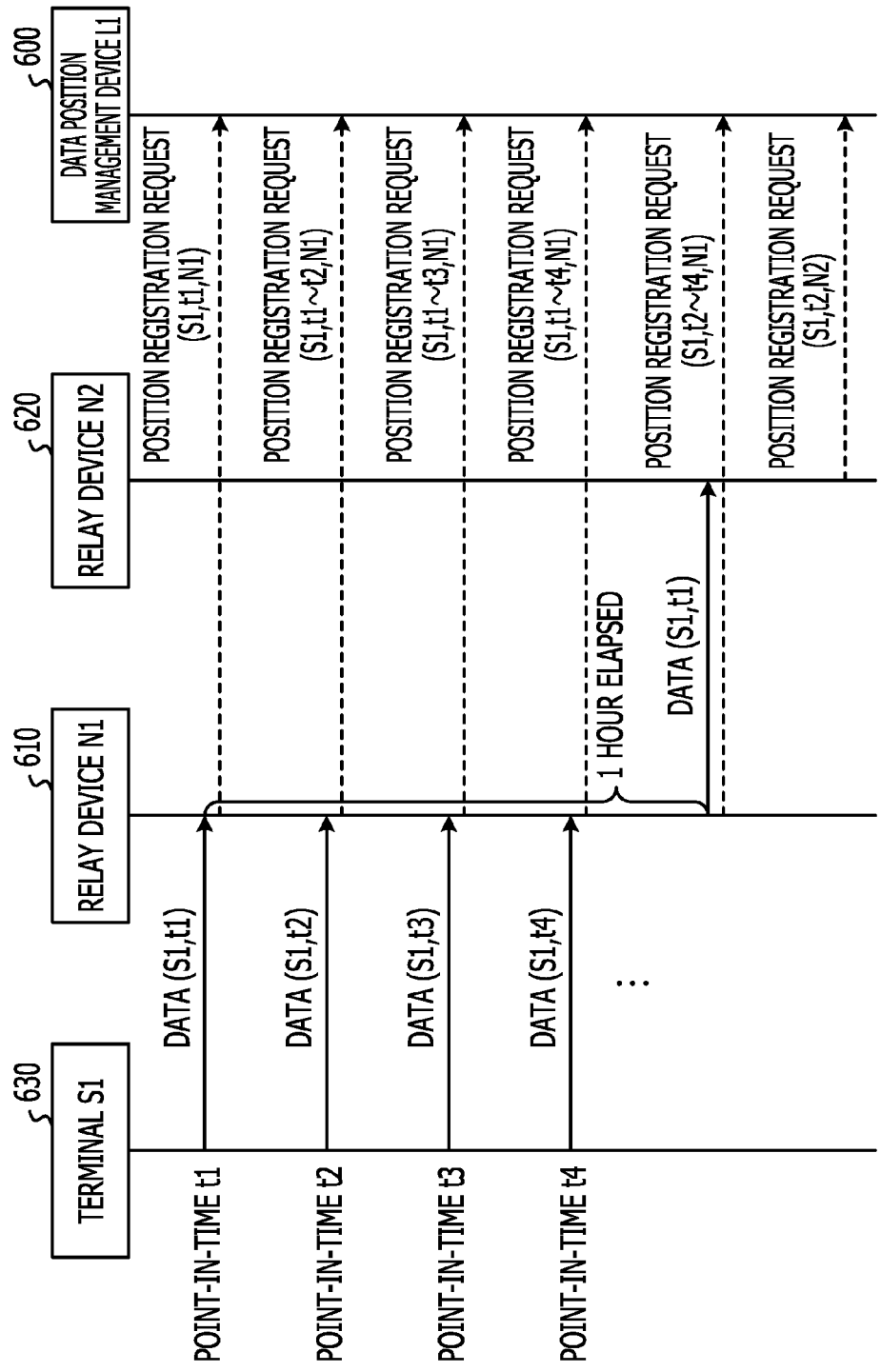
FIG. 11 is an example of communication by the communication system according to the embodiment.

FIG. 11 is an example of communication by the communication system according to the embodiment. The example illustrated in FIG. 11 is an operational example of the message sequence illustrated in FIGS. 8 and 10. Data is generated by the data generating source terminal 101 at points-in-time t1, t2, t3, and t4, and transmitted to the relay device 106. The relay device 106 receives the data transmitted from the data generating source terminal 101, accumulates in the storage 611, and transmits a position registration request for the data being accumulated to the data position management device 600.

Upon one hour elapsing from accumulation of the data at point-in-time t1 to the relay device 106, the data of point-in-time t1 is relocated from the relay device 106 to the relay device 107. Due to this relocating of data, the relay device 106 and relay device 107 each transmit a position registration request for the data being accumulated, to the data position management device 600.

Though omitted from illustration in FIG. 11, the data generating source terminal 101 continues to periodically generate data after point-in-time t4 as well, which is transmitted to the relay device 106, and the relay devices 106 and 107 relocate the data of which the accumulation periods has elapsed according to accumulation rules 615 and 625. Further, the change in the data being accumulated triggers the relay devices 106 and 107 to transmit position registration requests to the data position management device 600.

Figure 12:
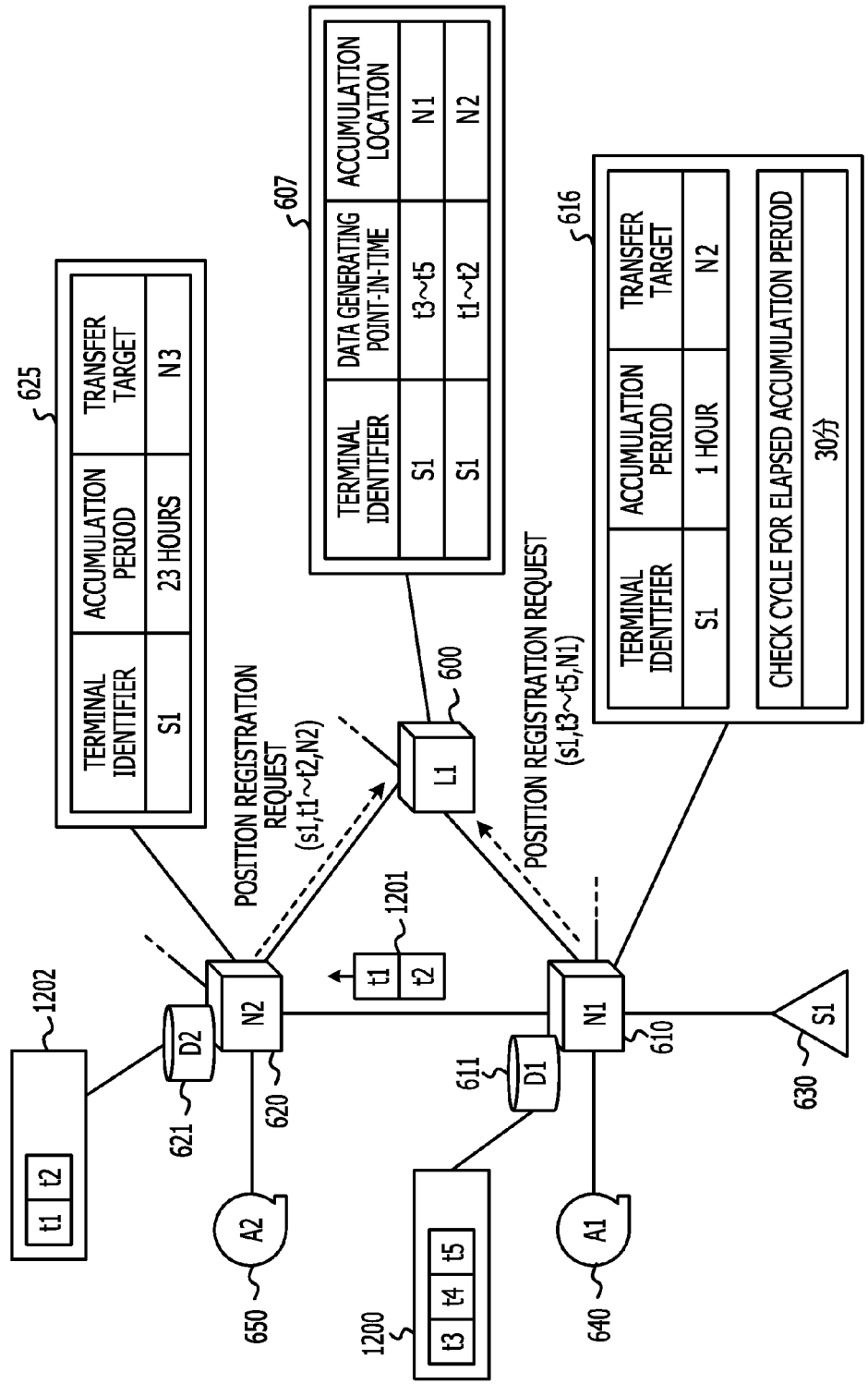
FIG. 12 is another example of a case in which data accumulated in one relay device is relocated to another relay device.

FIG. 12 is another example of a case in which data accumulated in one relay device is relocated to another relay device. The example illustrated in FIG. 12 is a different operation example from FIG. 10, and is an example of relocating multiple data accumulated in the relay device 106 to the relay device 107. In the example illustrated in FIG. 12, the data of point-in-time t1 and t2 which the data generating source terminal 101 has generated every 15 minutes is being relocated from the relay device 106 to the relay device 107 together.

Now, an arrangement may be made where, instead of the relay device 106 constantly monitoring whether or not the accumulation period given in the accumulation rules has elapsed, and each time the accumulation period of data elapses, the relay device 106 immediately relocates this data to the relay device 107. Rather, the relay device 106 may periodically check whether there is data regarding which the accumulation period has elapsed, and if there is data at that point that the accumulation period has already elapsed, relocate these to the relay device 107 together, as indicated in accumulation rules 1200. For example, in the example illustrated in FIG. 12, whether or not there is data regarding which the accumulation period has elapsed is checked every 30 minutes in accordance with the accumulation rules 1200, so that the data of t1 and t2 are relocated to the relay device 107 together.

Now, in the accumulation rules 1200 illustrated in FIG. 12, we will say that the check cycle of elapsing of accumulation period is 30 minutes, and that checking of elapsing of accumulation period is performed at the timings of 20 minutes, 50 minutes, and 80 minutes after starting accumulation of data at the relay device 106 at point-in-time t1. Note that at the point-in-time 20 minutes after, data of points-in-time t1 and t2 is accumulated in the relay device 106, at the point-in-time 50 minutes after, data of points-in-time t1 through t4 is accumulated, and at the point-in-time 80 minutes after, data of points-in-time t1 through t5 is accumulated.

At the point where the checking for elapsing of the accumulation period is performed 20 minutes after and 50 minutes after, each data is within one hour for the accumulation period thereof, so no data is relocated to the relay device 107. Next, at the point where the checking for elapsing of the accumulation period is performed 80 minutes after, 80 minutes and 65 minutes have elapsed from the start of accumulation for the data of point-in-time t1 and t2, respectively, which exceeds one hour of accumulation time. Accordingly, the data of point-in-time t1 and t2 are relocated from the relay device 106 to the relay device 107 together, as illustrated in FIG. 12.

Note that the period for checking for elapsing of the accumulation period may be set to other values. For example, if the check period is set to two hours, a maximum of two hours worth of data is accumulated in the storage 611 of the relay device 106. Each time checking for elapsing of the accumulation period is performed, data regarding which the accumulation period has exceeded one hour is relocated together. More specifically, data from the oldest data two hours ago, to data from one hour ago, is relocated from the relay device 106 to the relay device 107 together. In conjunction with this relocation of data, the relay device 106 and relay device 107 each perform a position registration request to the data position management device 600. As a result, t3 through t5 is registered in the data position information 605 in FIG. 12 as the range of generating point-in-time for the data being accumulated, by the position registration request made by the relay device 106. Also, t1 and t2 is registered as the range of generating point-in-time of the data being accumulated, by the position registration request made by the relay device 107. Thus, how much data is to be relocated together may be set in accordance of the usage frequency by the application A1 which uses the data accumulated in the storage 611 of the relay device 106.

The example illustrated in FIG. 12 may reduce increase in processing loads at the data position managing device and increase of message traffic amount of position registration request exchanged over the network, due to accumulation and relocation of data at each relay device and position registration requests in conjunction thereof to the data position managing device, in cases where the number of data generating source terminals is great or in cases where the generating frequency of data at the data generating source terminals is short.

Figure 13:
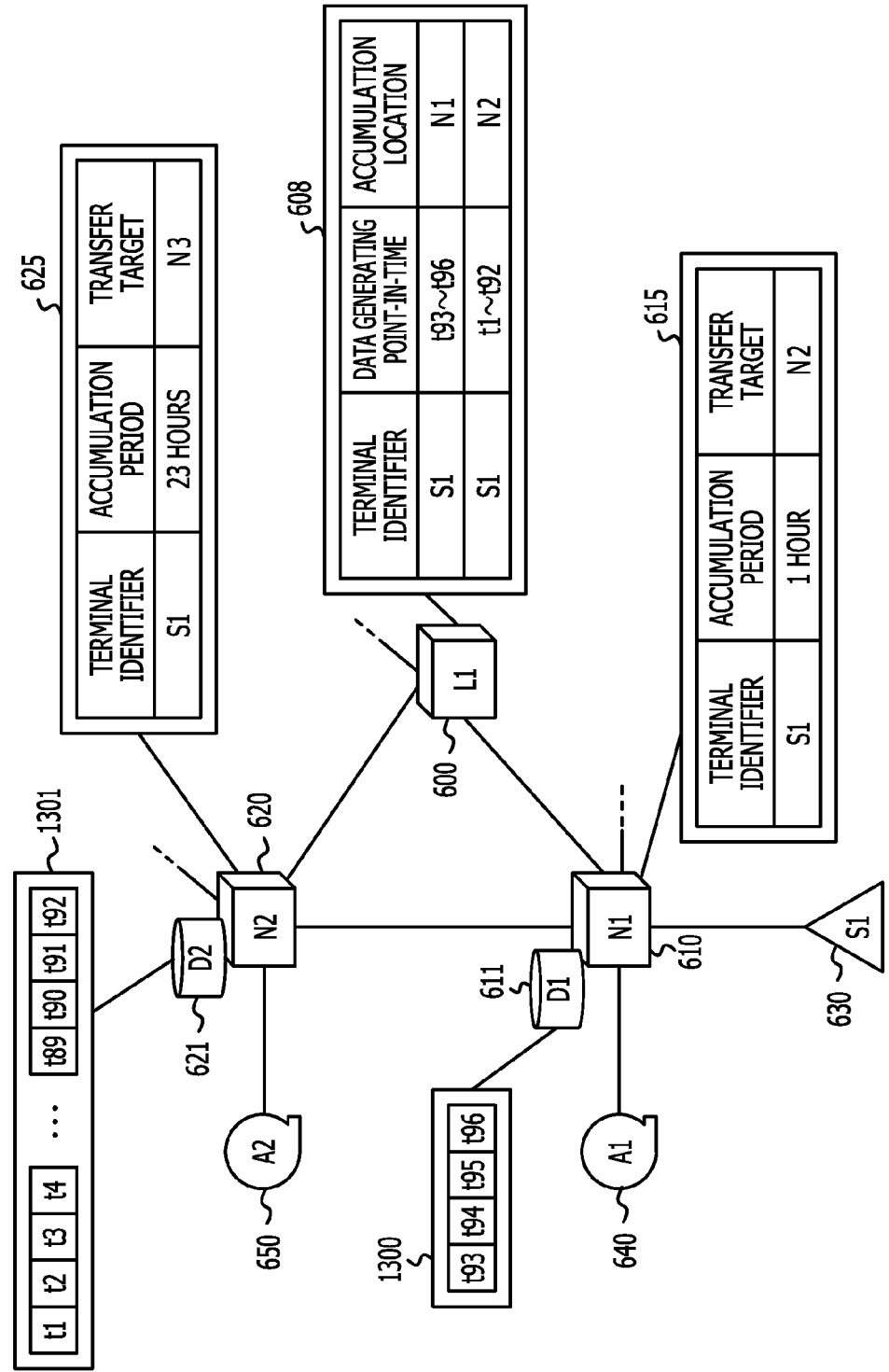
FIG. 13 is an example in which data generated by data generating terminals is accumulated in a distributed manner in relay devices according to the embodiment.

FIG. 13 is an example in which data generated by data generating terminals is accumulated in a distributed manner in relay devices according to the embodiment. This example illustrates a state where one day worth of data generated by the data generating source terminal 101 is stored in the relay devices 106 and 107. This is a state after one day has elapsed from the point where the data at generating point-in-time 1 was generated and accumulated in FIG. 8. The relay device 106 has accumulated therein data of point-in-time t93 through t96, which is one hour worth from the newest data, while the relay device 107 has accumulated therein data of point-in-time t1 through t92, which is data from one hour ago to 23 hours ago, that has been relocated from the relay device 106.

Figure 14:
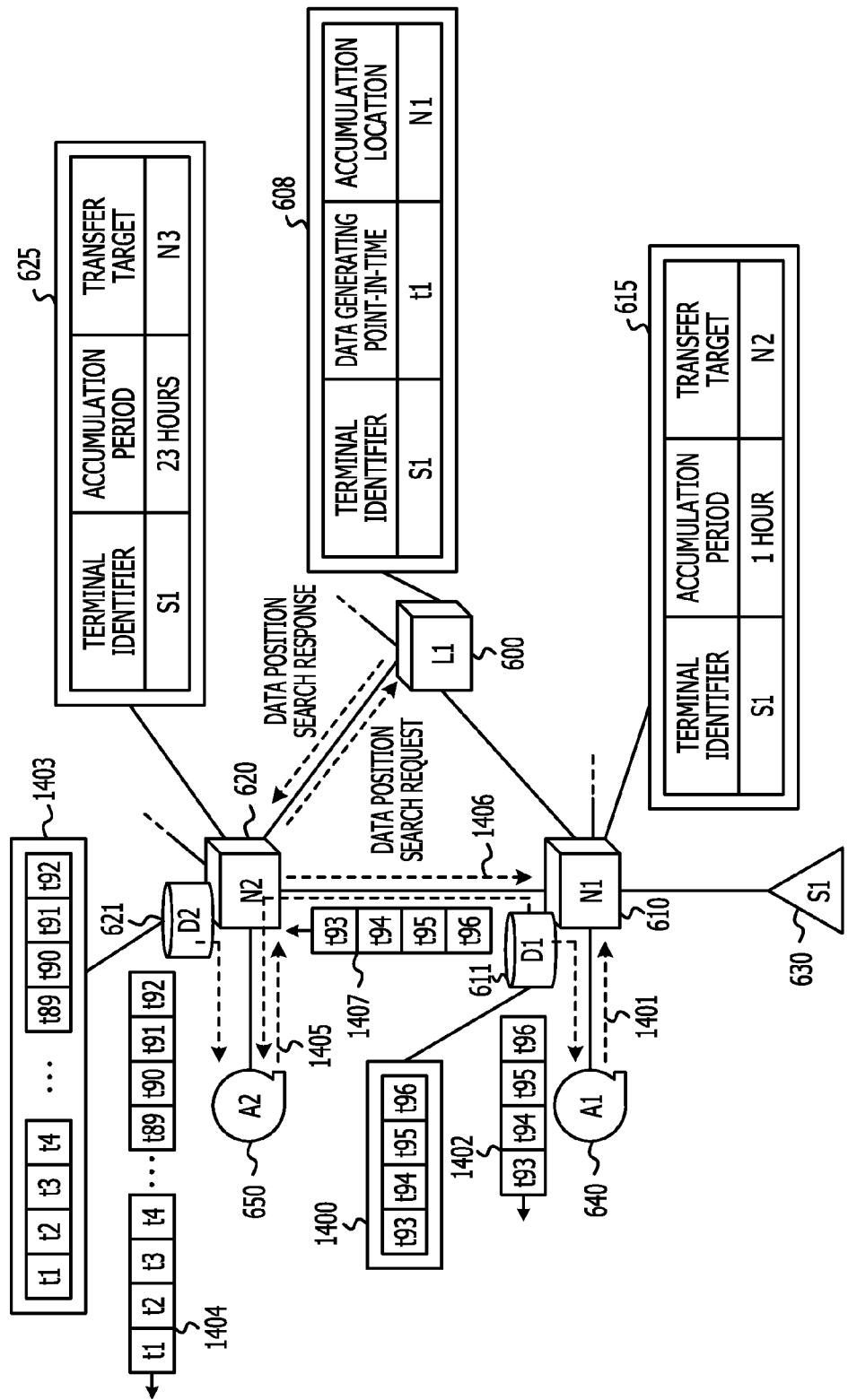
FIG. 14 is an example of a case in which one relay device requests data transfer to another relay device according to the embodiment.

FIG. 14 is an example of a case in which one relay device requests data transfer from another relay device according to the embodiment. The example illustrated in FIG. 14 is a case where data is accumulated as illustrated in FIG. 13, and the application A1 requests the relay device 106 to acquire data, and also the relay device 107 requests the relay device 106 for a data transfer, triggered by a data acquisition request from the application A2 to the relay device 107.

The application A1 directly makes an acquisition request 1401 to the relay device 106 for one hour worth of data from the newest data. This is the same as the operations illustrated in FIG. 9. The relay device 106 which has received the acquisition request 1401 has accumulated data from point-in-time t93 through t96, which is one hour worth of data from the newest data, reads out the data 1402 at the generating point-in-time t93 through t96 from the storage 611, and transmits this to the application A1 which is the requesting source.

On the other hand, the application A2 makes an acquisition request 1405 to the relay device 107 for one day worth of data from the newest data. The relay device 107 which has received the acquisition request 1405 confirms whether the requested data is accumulated in the storage 621. This confirmation by the relay device 107 finds that the data accumulated in the storage 621 is data of point-in-time t1 through t92, and that the newest data thereof is data of point-in-time t92, which is one hour ago, and determines that the data of one hour worth from the newest data is accumulated in another relay device. The relay device 107 then transmits a position search request to the data position management device 600, and requests a search for a relay device which has accumulated thereat, of the data generated by the data generating source terminal 101, one hour worth of data from the newest data.

Based on the data position information 605 illustrated in FIG. 13, the data position management device 600 extracts that the data included in the one hour worth of data from the newest data is data of point-in-time t93 through t96, and that these are accumulated in the relay device 106, and transmits a data position search response to the relay device 107.

Next, the relay device 107 makes a transfer request 1406 for the one hour worth of data from the newest data to the relay device 106, in accordance with the position search response. The relay device 106 which has received the transfer request 1406 performs a data transfer 1407 of the data of point-in-time t93 through t96 stored in the storage 611, to the relay device 107.

Accordingly, the relay device 107 transmits the data 1404 of point-in-time t1 through t92 accumulated in the storage 621, and the data 1407 of point-in-time t93 through t96 transferred from the relay device 106, to the application A2 which is the acquisition request source.

According to the above-described embodiment, even if data requested by an application is not accumulated at the relay device, data to be used for the application may be transmitted to the application by requesting transfer from another relay device.

For example, if data generated by a data generating source terminal is sequentially relocated through relay devices, focusing on difference in the range of data which applications use, there may be cases where the data range to be used overlaps. According to the embodiment, even in such a case the application may acquire lacking data in the range requested, by requesting data transfer to a relay device accumulating that data. Also, according to the embodiment, data other than the lacking data has been accumulated in the relay device beforehand, so the amount of time from accepting the data acquisition request from the application up to delivering the lacking data to the application may be shortened.

Also, by arranging the order of relay devices through which the data is to be relocated such that relocate starts from the data requested by the application having a shorter time range, a great number of data which the application A2 uses is accumulated in the relay device 107 beforehand, while the remaining data is accumulated in the relay device 106 in a distributed manner, from the perspective of the application A2. Thus, the capacity of the storage 621 of the relay device 107 assigned to the application A2 may be reduced by one hour worth in the above example.

Also, the fact that there is difference in the amount of data accumulated in the relay device 107 beforehand and the amount of lacking data may be taken advantage of, to acquire the data 1407 of point-in-time t93 through t96 which is the lacking data, in parallel with the data 1404 of point-in-time t1 through t92 being transferred to the application A2 from the point that the application A2 has requested the relay device 107 for data acquisition. Accordingly, the time which it takes for the application to acquire the data may be used more efficiently.

Figure 15:
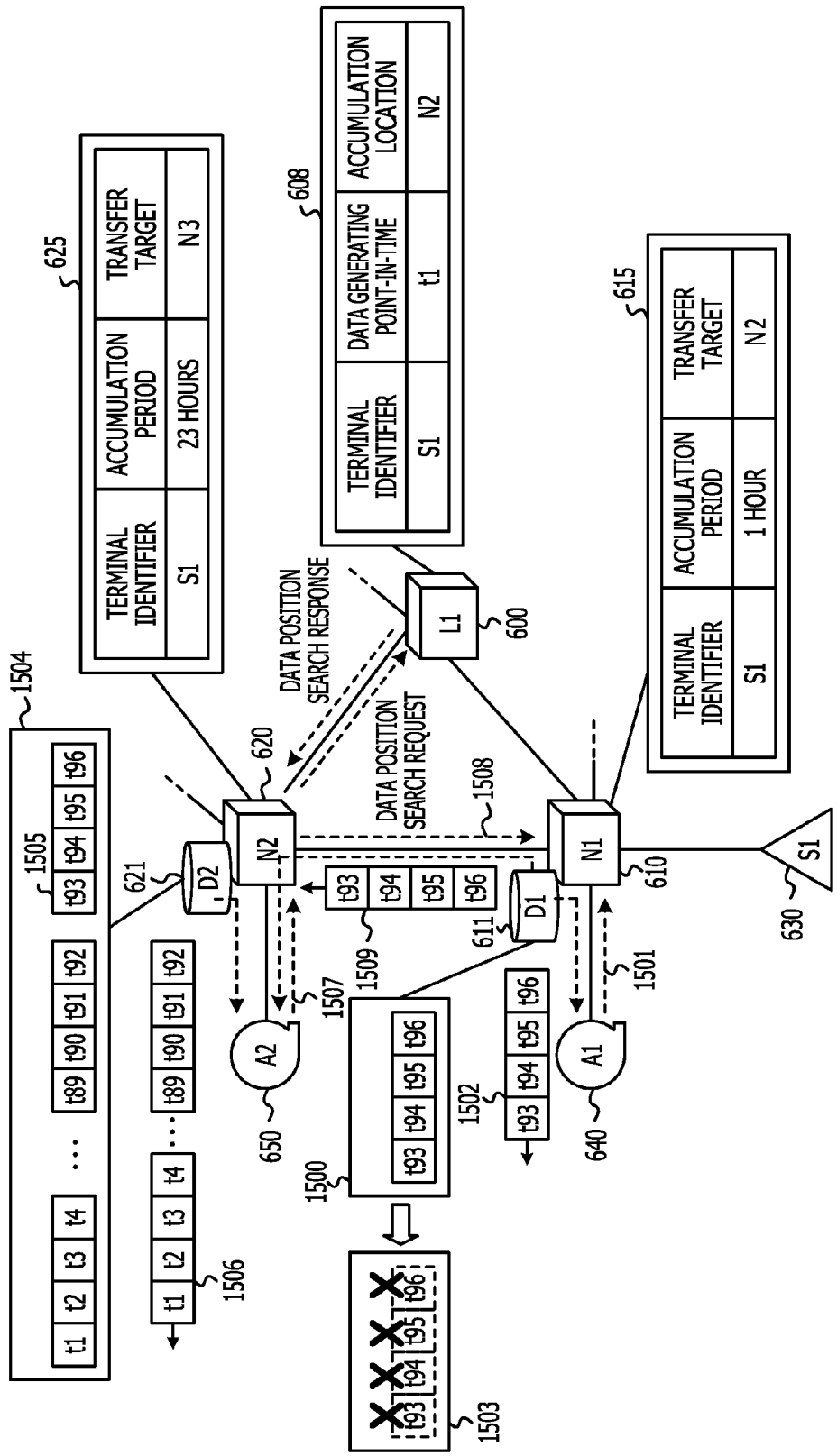
FIG. 15 is another example of a case in which one relay device requests data transfer to another relay device according to the embodiment.

FIG. 15 is another example of a case in which one relay device requests data transfer from another relay device according to the embodiment. The example illustrated in FIG. 15 is a modification of that illustrated in FIG. 14. This is an example of a case where data which has been transferred in response to a data acquisition request is kept stored, and at the point that the transfer timing arrives according to the accumulation rule, deletes the data since it has already been transferred. Accordingly, description of processing which is the same as that in FIG. 14 will be omitted, and description will start from the point after the operation in which the relay device 106 which has received the transfer request 1406 performs the data transfer 1407 of the data of point-in-time t93 through t96 accumulated in the storage 611 to the relay device 107.

The relay device 107 provides the data of point-in-time t93 through t96 that has been transferred from the relay device 106 to the application A2, and also copies the data of point-in-time t93 through t96, and accumulates the copied data 1500 in the storage 621.

Upon performing the data transfer 1407 of the data of point-in-time t93 through t96 to the relay device 107, the relay device 106 stores the fact that the data of point-in-time t93 through t96 has already been transferred to the relay device 107. Now, the accumulation rule 615 says that the data of point-in-time t93 through t96 is to be transferred to the relay device 107 once the accumulation period thereof reaches one hour, but the relay device 106 does not relocate the data of point-in-time t93 through t96 to the relay device 107 at this time, since it has already been transferred, but rather deletes it from the storage 611, as indicated by 1501.

According to this embodiment, data already transferred from the relay device 106 to the relay device 107 is kept from being transferred again after the accumulation period thereof elapses, thereby reducing traffic.

Figure 16:
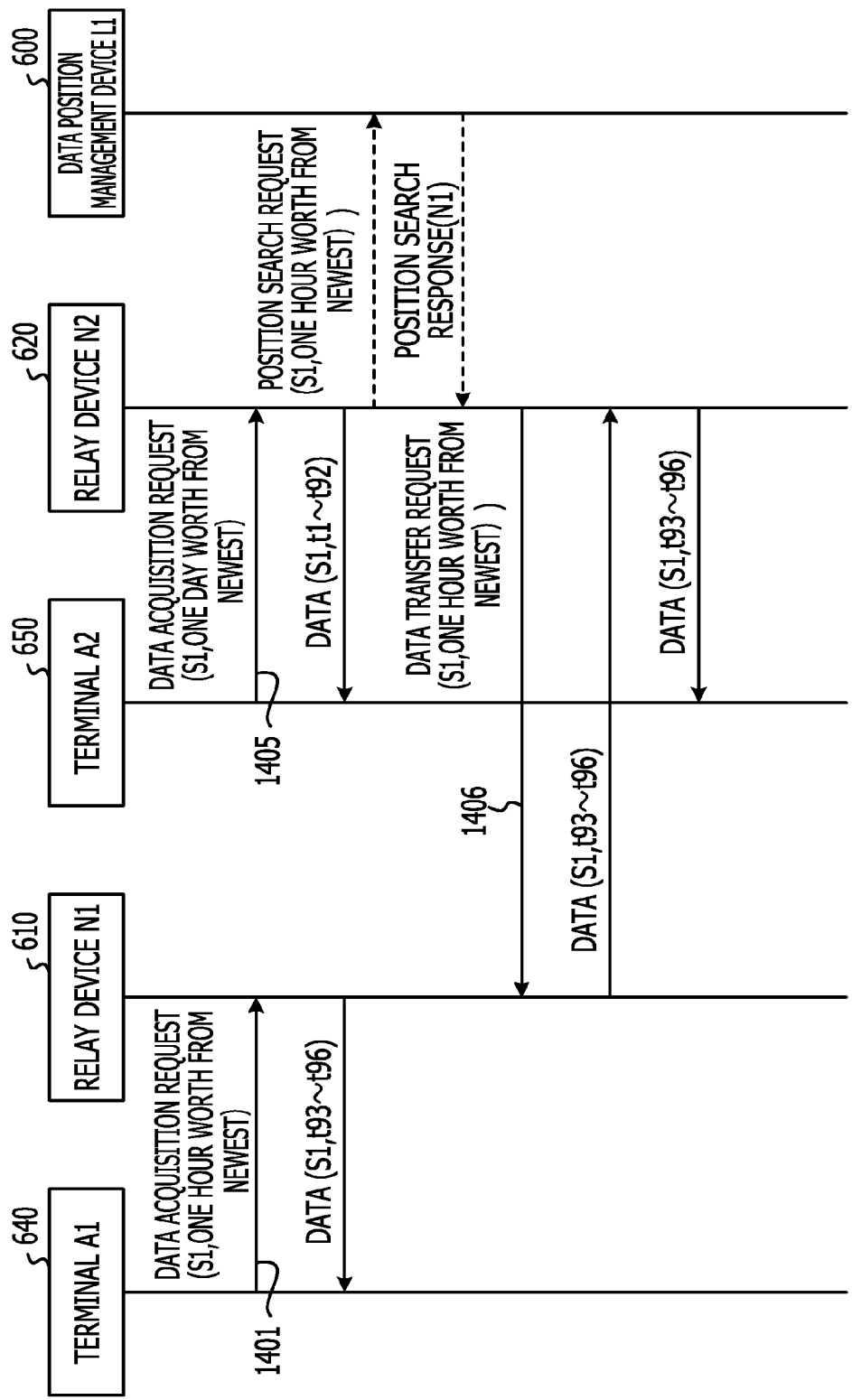
FIG. 16 is another example of communication by the communication system according to the embodiment.

FIG. 16 is another example of communication by the communication system according to the embodiment. The example illustrated in FIG. 16 is an example illustrating a message sequence in the operation example in FIG. 14. Here, the relay device 107 transmits the data of point-in-time t1 through t92 accumulated in the storage 621 to the application A2, and thereafter performs a position search request to the data position management device 600, a data transfer request to the relay device 106, and transmission of the data of point-in-time t93 to t96 transferred from the relay device 106 to the application A2. Note that these operations may be performed in parallel, or may be performed in opposite order.

Figure 17:
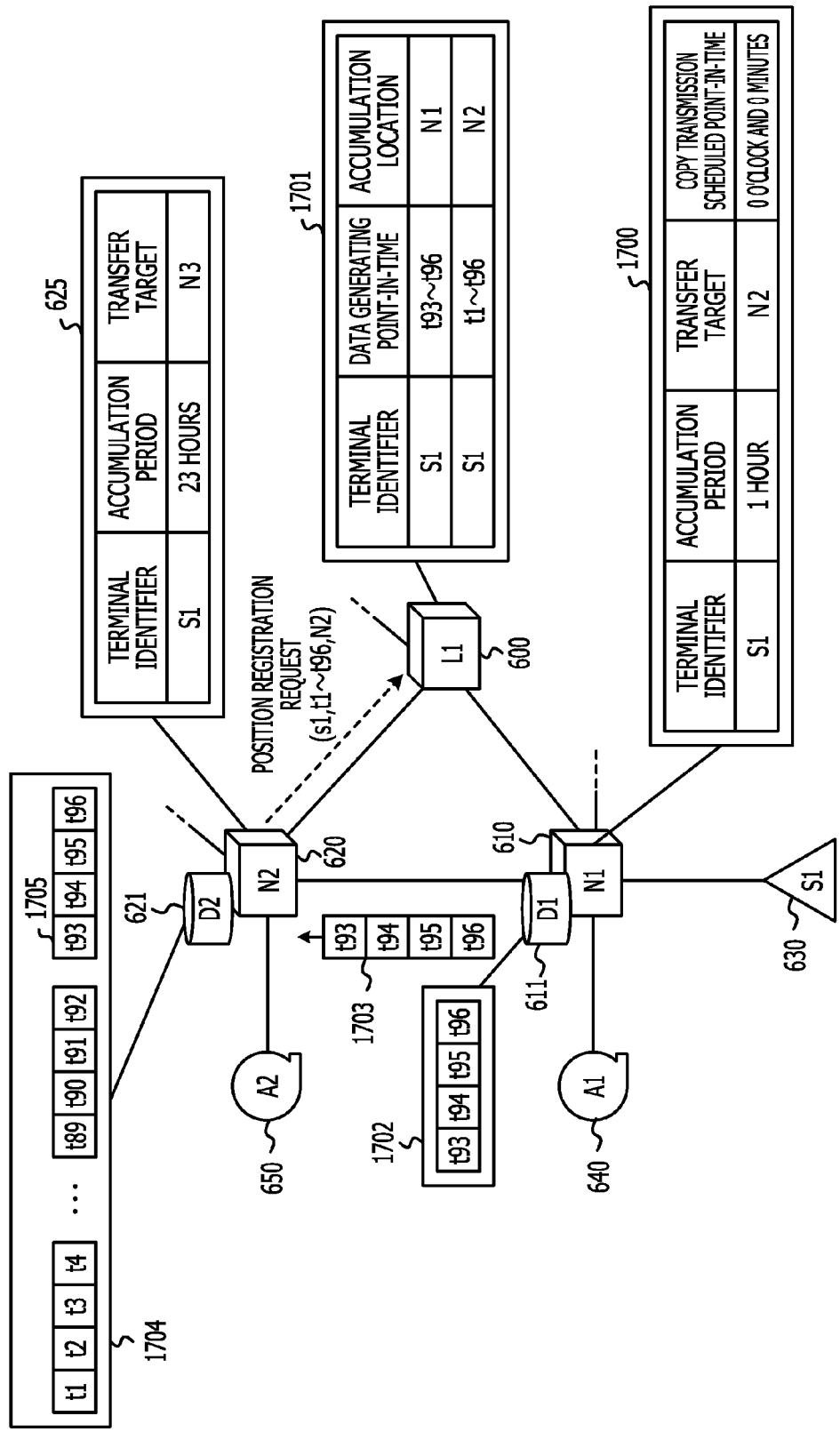
FIG. 17 is an example of a case in which one relay device copies data and transfers to another relay device.

FIG. 17 is an example of a case in which one relay device copies data and transfers to another relay device. In the example illustrated in FIG. 17, out of one day worth of data which the data generating source terminal 101 generates, one hour worth of data from the newest data is stored in the relay device 106, and data from one hour ago to 23 hours ago is accumulated in the relay device 107. In this state, the data of point-in-time t93 to t96 accumulated in the relay device 106 is copied, and the copied point-in-time t93 to t96 data 1701 is transferred to the relay device 107. Note that the data accumulated in the storage 611 of the relay device 106 remains unchanged at data of point-in-time t93 to t96. On the other hand, data accumulated in the storage 621 of the relay device 107 increases, and data of point-in-time t1 to t96, that is to say one day worth of data from the newest data, is stored. The relay device 107 is triggered by change in the accumulated data to make a position registration request to the data position management device 600.

Now, creating of copies of data at the relay device 106 and transferring to the relay device 107 is executed before the acquisition request of the one day worth of data from the newest data is performed from the application A2 to the relay device 107. Accordingly, a copy transmission scheduled point-in-time (0 o'clock and 0 minutes in the example in FIG. 17) is provided as accumulation rules 1700. This copy transmission scheduled point-in-time determines beforehand the frequency of data acquisition request by the application A2 and also the execution point-in-time thereof.

In the event that the communication system 200 comprehends that execution point-in-time, this may be set to the relay device 106. Alternatively, in a case where the relay device 106 receives several data transfer requests for one hour worth of data from the newest data from the relay device 107, the point-in-time at which the next data transfer request will be executed may be predicted and set based on the difference in these points-in-time. When the copy transmission scheduled point-in-time arrives, the relay device 106 creates a copy of accumulated data and transfers this to the relay device 107 which is the transfer target, regardless of whether or not the accumulation period of the data being accumulated has passed the time stipulated in the accumulation rile 1700. According to this embodiment, the amount of data prepared at the relay device 107 before the transfer request of data by the application A2 is greater, so the response of data transfer to the application A2 is better.

Figure 18:
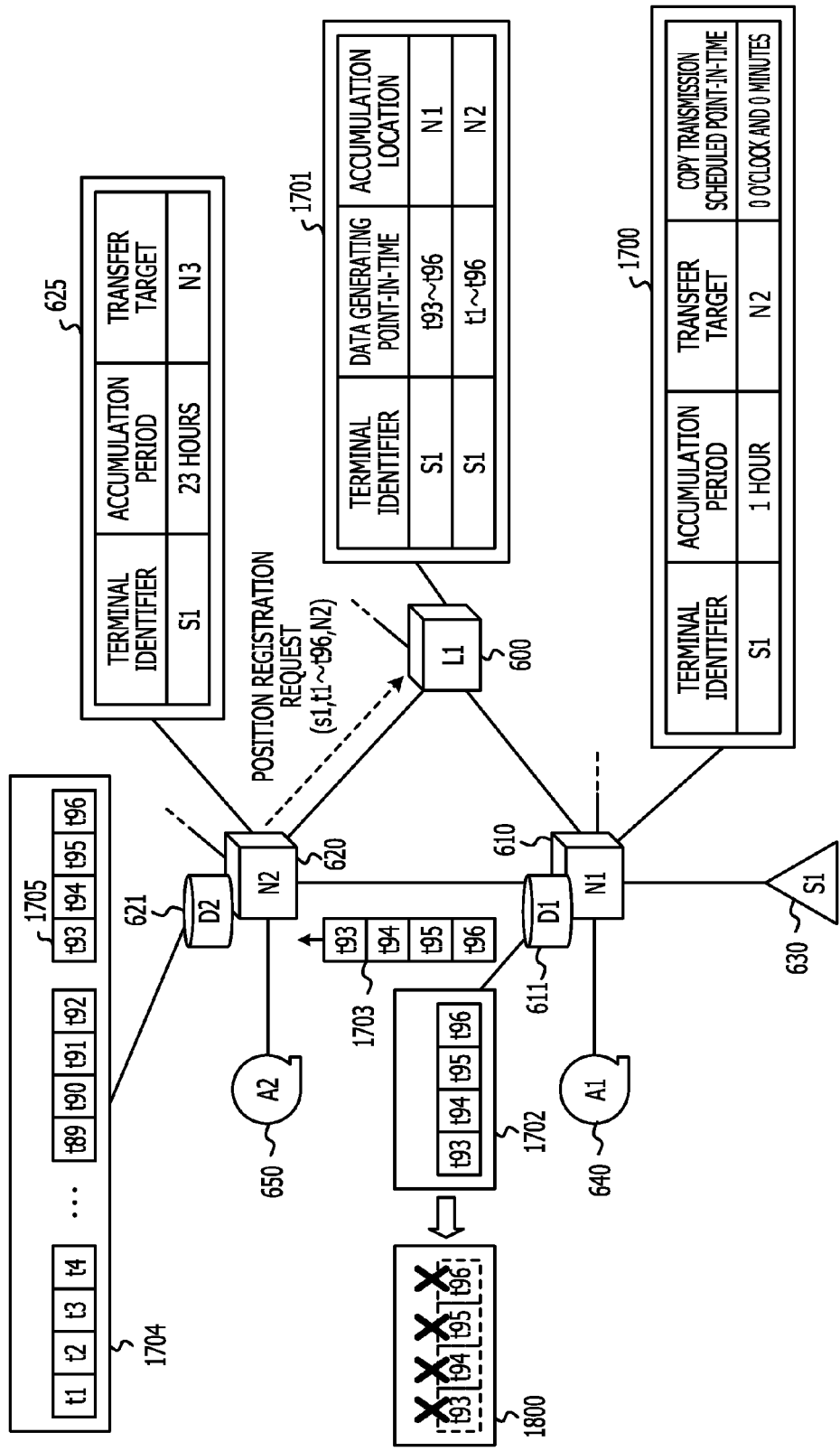
FIG. 18 is another example of a case in which one relay device copies data and transfers to another relay device.

FIG. 18 is another example of a case in which one relay device copies data and transfers to another relay device. The example in FIG. 18 is a modification of that in FIG. 17, and is an example where the relay device 106 stores that a copy of the data of point-in-time t93 to t96 has already been transferred to the relay device 107, and when the timing for transfer of data according to the accumulation rule arrives, deletes the data since it has already been transferred. Accordingly, description of processing which is the same as that in FIG. 17 will be omitted, and description will be made from the point after the relay device 106 has performed the data transfer 1701 of the data of point-in-time t93 to t96 to the relay device 107.

Upon executing the data transfer 1701 of the data of point-in-time t93 to t96, the relay device 106 stores that the data of point-in-time t93 to t96 has already been transferred to the relay device 107. At the point that the accumulation time of the data of point-in-time t93 to t96 has passed one hour, the accumulation rule 1700 stipulates that the data is to be transferred to the relay device 107, but the data of point-in-time t93 to t96 is not transferred to the relay device 107 since it has been transferred already, and rather is deleted from the storage 611 as indicated by 1800.

According to this embodiment, traffic occurring due to retransmitting data already transferred from the relay device 106 to the relay device 107 after the accumulation period has elapsed may be reduced.

Figure 19:
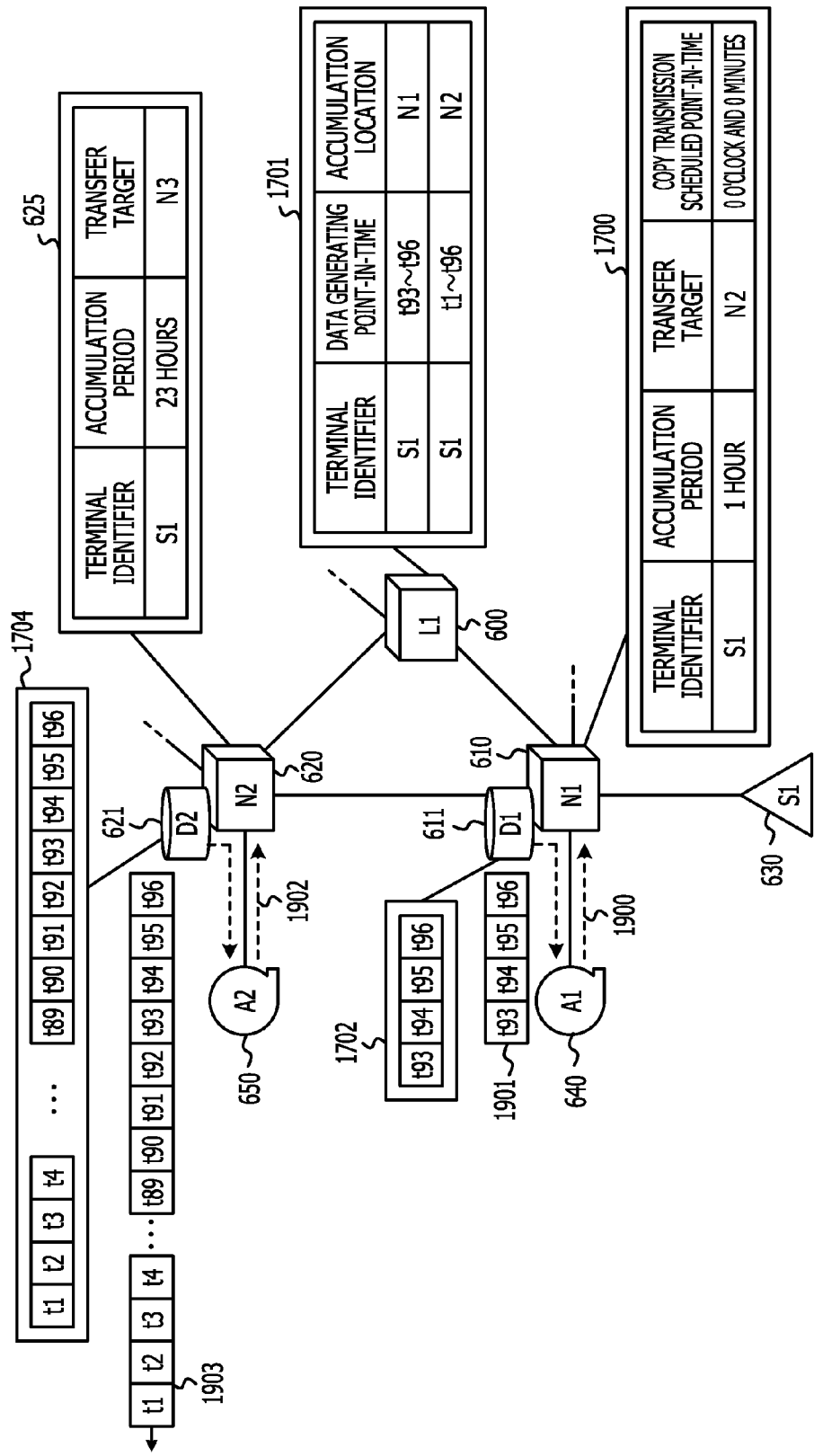
FIG. 19 is an example of a case in which one relay device copies data and transfers to another relay device, following which data is transferred to an application.

FIG. 19 is an example of a case in which one relay device copies data and transfers to another relay device, following which data is transferred to an application. The example illustrated in FIG. 19 is an example of operations in a case where data acquisition requests 1900 and 1902 are made from the application A1 and application A2 respectively, in a state where data has been accumulated as illustrated in FIGS. 17 and 18. Operations regarding the application A1 are the same as in FIG. 14. As for the application A2, the one day worth of data from the newest data regarding which the application A2 makes a data acquisition request is accumulated in the storage 621 of the relay device 107, so the relay device 107 may transmit the data 1903 for point-in-time t1 through t96 to the application A2 without making a position search request to the data position management device 600 and a data transfer request to the relay device 106.

Figure 20:
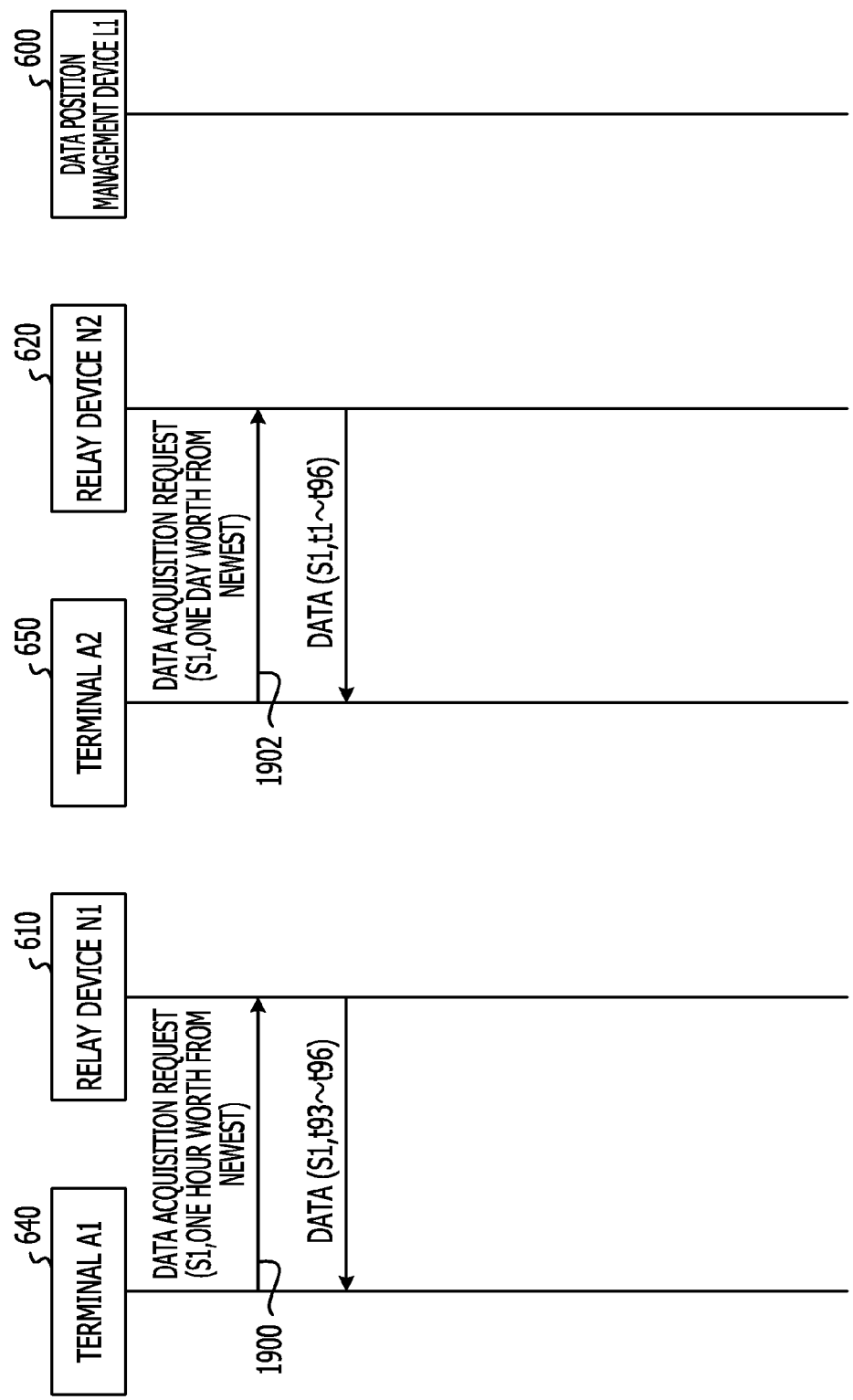
FIG. 20 is a message sequence for the operation example in FIG. 19.

FIG. 20 is a message sequence for the operation example in FIG. 19, in which the reference symbols are the same as those used in the description of FIG. 19.

Figure 21:
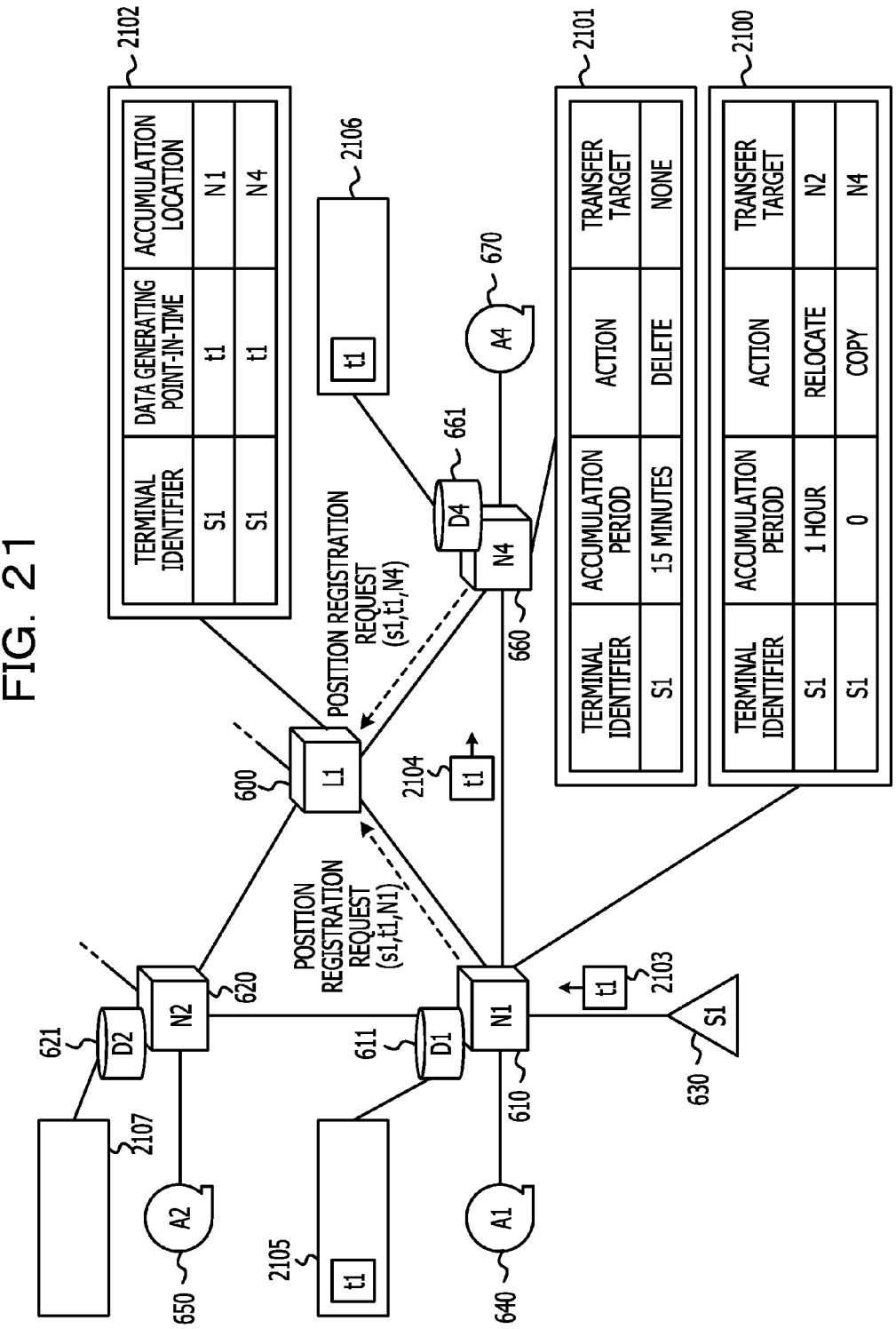
FIG. 21 is an example of a case in which there are multiple data transfer targets for the relay device according to the embodiment.

FIG. 21 is an example of a case in which there are multiple data transfer targets for the relay device according to the embodiment. In addition to the relay devices 106 and 107, the data position management device 600, the data generating source terminal 101, and the data usage terminals 130 and 131, FIG. 21 also illustrates the relay device 105 connected to the relay device 106, and a data usage terminal 670 which uses the data accumulated in the relay device 105. We will say that this data usage terminal 670 uses the newest data of the data generating source terminal 101 at a frequency of one every 15 minutes.

In FIG. 21 the data generating source terminal 101 transmits data generated at point-in-time t1 to the relay device 106. In accordance with the accumulation rule 2100 regarding the data of the data generating source terminal 101, the relay device 106 relocates data to the relay device 107 after having accumulated the data for one hour, while on the other hand transfers a copy of the data to the relay device 105 immediately after having received the data (accumulation period zero). Thus, the relay device 106 starts accumulation of data in the storage 611 at the point of having received the data of point-in-time t1 from the data generating source terminal 101, makes a position registration request to the data position management device 600, creates a copy of the data, and executes data transfer 2103 to the relay device 105 which is the transfer target.

The relay device 105 applies an accumulation rule 2101 independent from the relay device 106 with regard to the data t1 generated by the data generating source terminal 101. The relay device 105 follows the accumulation rule 2101 to start accumulation of the data t1 in its own storage 661 in a case of having received the data of point-in-time t1 of the data generating source terminal 101 transferred from the relay device 106, and makes a position registration request to the data position management device 600. After having accumulated the data for 15 minutes, the relay device 105 deletes the data t1 from the storage 661 without transferring to another relay device.

Note that in the example in FIG. 21, the accumulation period in the accumulation rule 2101 at the relay device 105 is set to 15 minutes, which is the same as the generating cycle of the data generated by the data generating source terminal 101, and the action is "delete". However, an arrangement may be made where the accumulation period is 15 minutes or more, and the action is set to "overwrite", so that the newest data of the data generating source terminal 101 is constantly stored in the storage 661 of the relay device 105.

Figure 22:
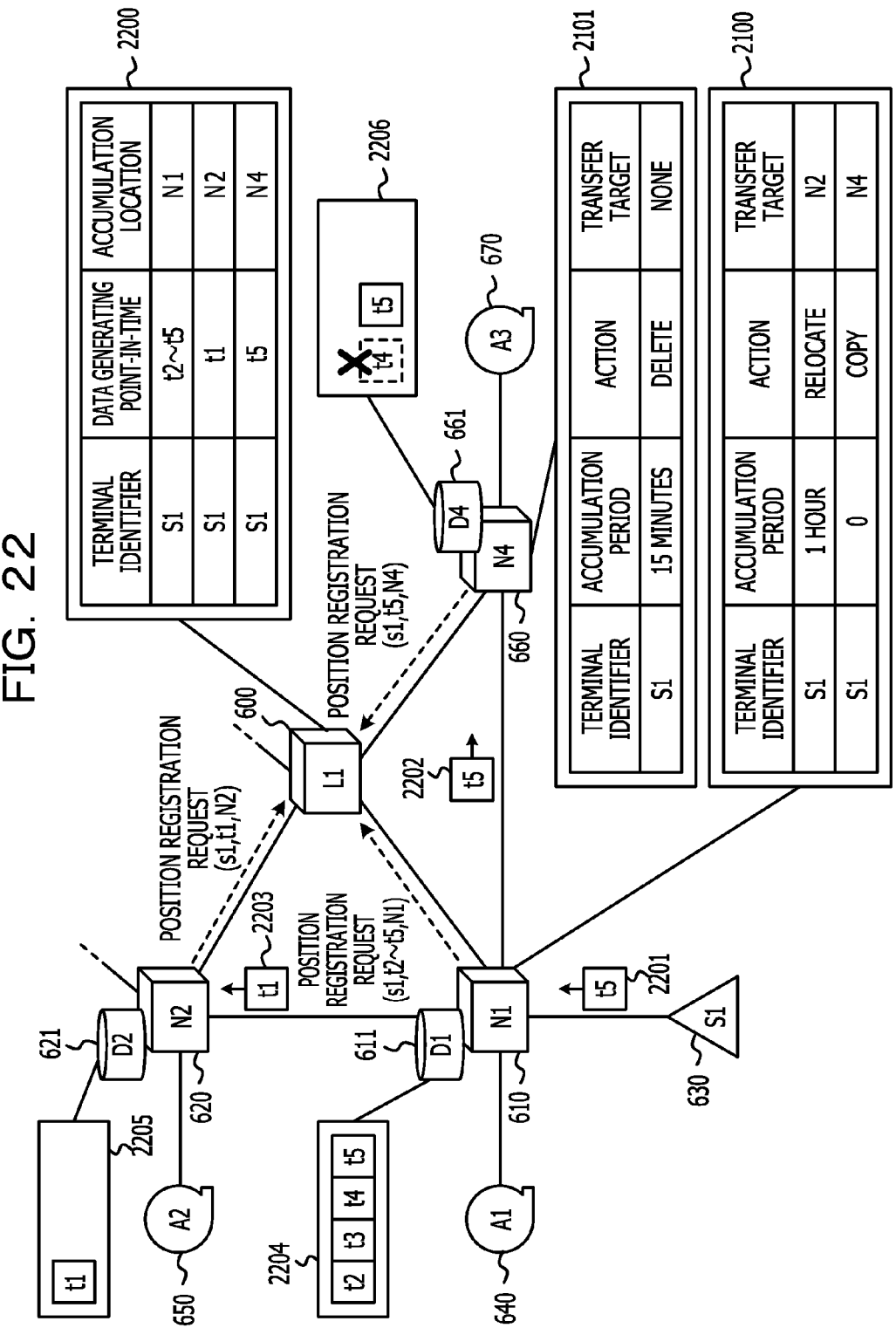
FIG. 22 is another example of a case in which there are multiple data transfer targets for the relay device according to the embodiment.

FIG. 22 is another example of a case in which there are multiple data transfer targets for the relay device according to the embodiment. The example illustrated in FIG. 22 is an example of operations at the point that one hour has elapsed from the state described following FIG. 21. On hour has elapsed from starting accumulation of the data of point-in-time t1 from the state of having accumulated the data of point-in-time t1 through t4 in the storage 611, so the relay device 106 relocates the data of point-in-time t1 to the relay device 107 following the accumulation rule 2100.

Also, the data of point-in-time t5 which has been newly generated is transmitted from the data generating source terminal 101 to the relay device 106. The relay device 106 follows the accumulation rule 2100 to accumulate the data of point-in-time t5 in the storage 611, and also to create a copy of the data at point-in-time t5 and transfer this to the relay device 105.

As a result, the data of point-in-time t2 through t5 is accumulated in the storage 611 of the relay device 106. The relay device 106 makes a position registration request for the data being accumulated to the data position management device 600. Note that in a case where relocating of the data of point-in-time t1 to the relay device 107 and reception of the data of point-in-time t5 from the data generating source terminal 101 have continuously occurred in a short time, the relay device 106 may perform a position registration request for both of these together, or perform position registration requests separately, as illustrated in FIG. 22.

In the same way as with the operations illustrated in FIG. 10, the relay device 107 accumulates the data of the point-in-time t1 that has been relocated form the relay device 106 in the storage 621, and makes a position registration request to the data position management device 600.

Accumulation of the data of point-in-time t4 has passed 15 minutes at the relay device 105, so the relay device 105 deletes the data of point-in-time t4 from the storage 661 in accordance with accumulation rule 2101. Also, the relay device 105 receives a copy of the data at point-in-time t5 from the relay device 106, and accumulates the data of the point-in-time t5 in the storage 661, and then makes a position registration request for the data being accumulated to the data position management device 600 in accordance with accumulation rule 2101. Note that in a case where deleting of the data of point-in-time t4 and starting accumulation of the copy of the data of point-in-time t5 have continuously occurred in a short time, the relay device 105 may perform a position registration request for both of these together, or perform position registration requests separately.

Upon the above operations being completed, the data of point-in-time t1 through t5 generated by the data generating source terminal 101 is handled based on the data position information 605 at the data position management device 600, such that the data of point-in-time t2 through t5 (one hour from the newest data) is stored in the storage 611 of the relay device 106, data of the point-in-time t1 (more than one hour ago) is accumulated in the storage 621 of the relay device 107, and the data of the point-in-time t5 (newest) is accumulated in the storage 661 of the relay device 105, and other relay devices may identify this.

Figure 23:
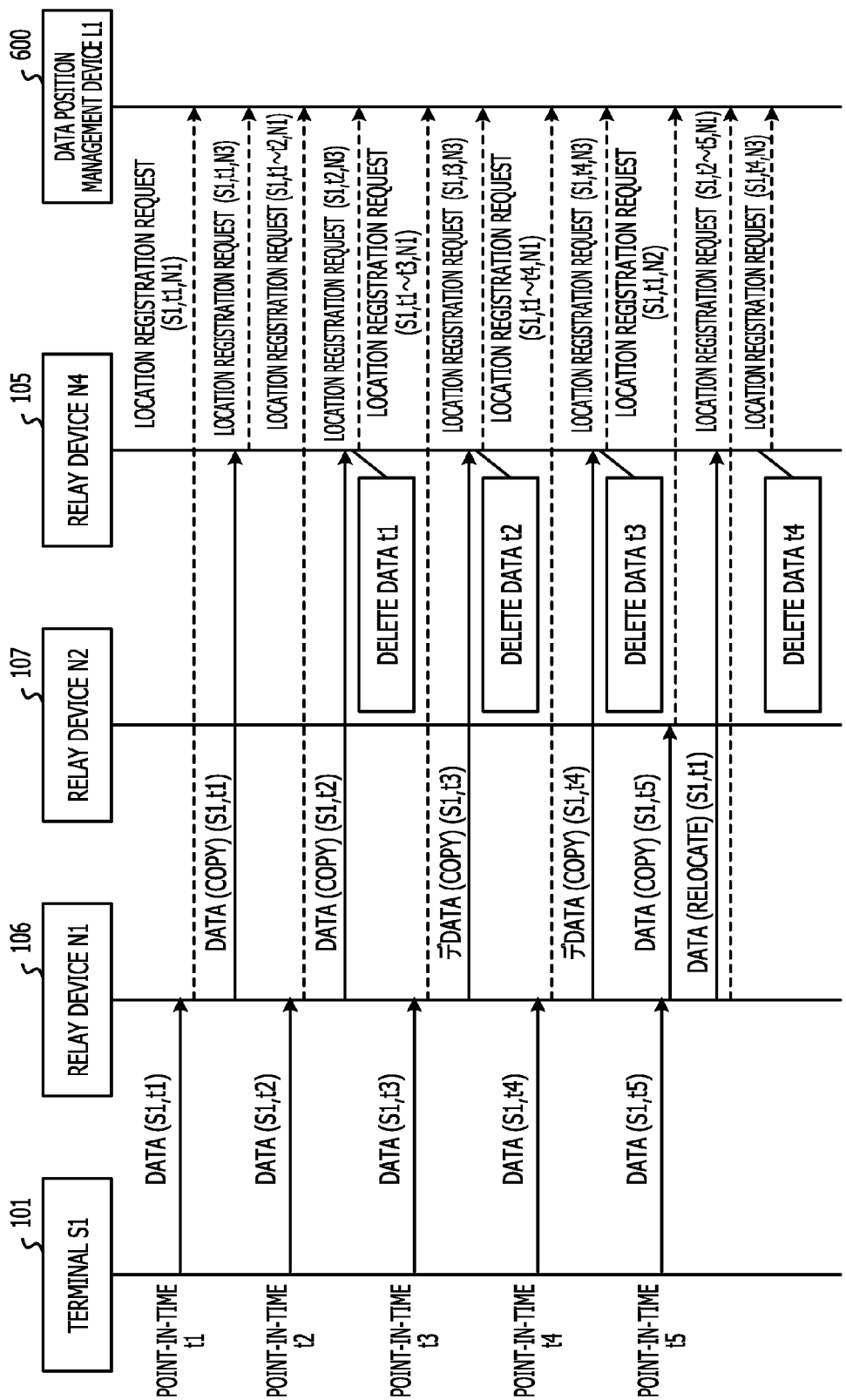
FIG. 23 is a message sequence for the operation examples in FIGS. 21 and 22.

FIG. 23 is a message sequence for the operation example in FIGS. 21 and 22, in which the reference symbols are the same as those used in the description thereof.

Figure 24:
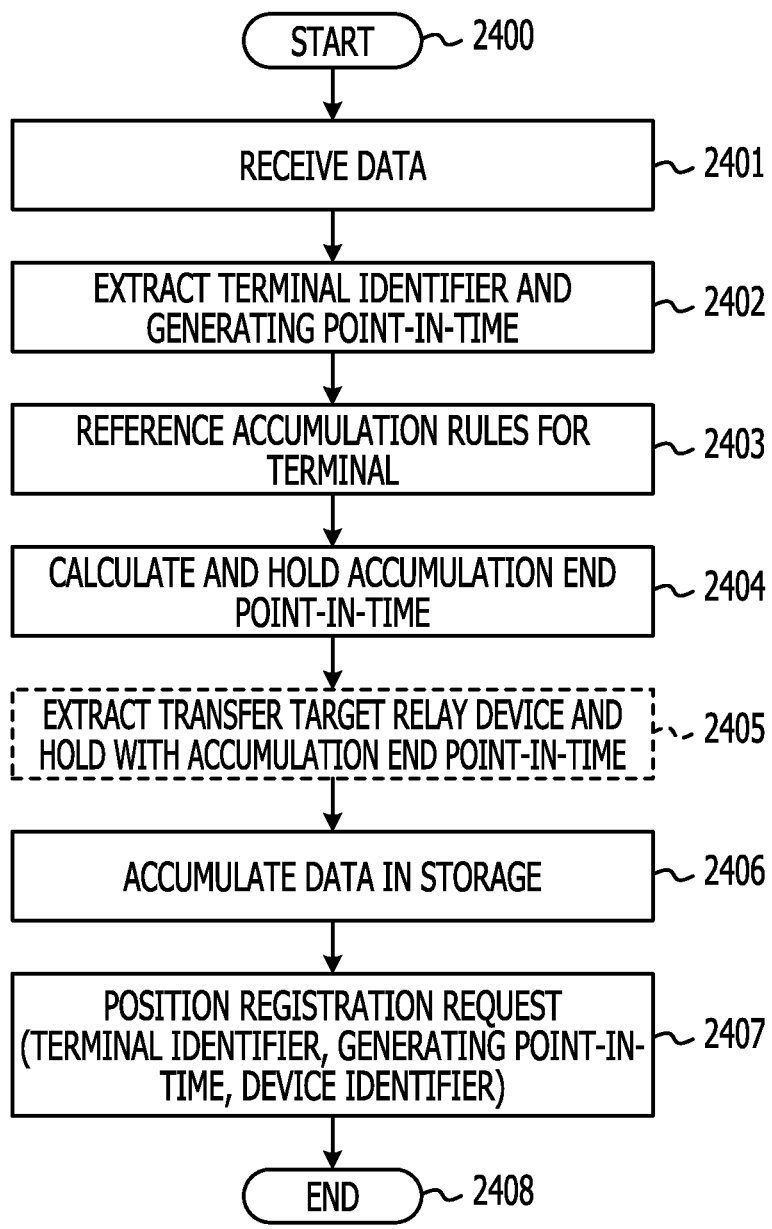
FIG. 24 is an example of processing when receiving data at the relay device according to the embodiment.

FIG. 24 illustrates an example of processing at the time of data reception at the relay device according to the embodiment. Processing 2401 to receive data is executed by the transmission/reception unit 400. The relay device receives a message including sensor data generated by the data generating source terminal according to the processing 2401.

Processing 2402 to extract the terminal identifier and generating point-in-time is executed by the identification unit 401. In the processing 2402, the received message and analyzed, and the terminal identifier of the data generating source terminal and the generating point-in-time of the data are extracted from the received message.

Processing 2403 to reference accumulation rules for the terminal is executed by the identification unit 401. In the processing 2403, accumulation rules stipulated regarding the terminal identifier extracted in processing 2402 is referenced.

Processing 2404 to calculate and hold an accumulation end time is executed by the accumulation time managing unit 430. In process 2404, the accumulation end time is calculated based on the accumulation period stipulated in the accumulation rule reference in processing 2403, and the current point-in-time. The calculated accumulation end time is then held at the accumulation time managing unit 430.

Processing 2405 to extract the transfer target relay device and hold along with the accumulation end time is executed by the accumulation time managing unit 430 and data control unit 420. Note that the processing 2405 is processing which may be executed instead of the processing 2404. In processing 2405, the transfer target relay device is extracted by the data control unit 420 following the accumulation rules stipulated by the accumulation rules reference in processing 2403, and the information of the transfer target relay device that has been extracted is held at the accumulation time managing unit 430 along with the calculated accumulation end point-in-time.

Processing 2406 to accumulate data in the storage is executed by the data control unit 420. In the processing 2406, data generated by the data generating source terminal which is included in the received message is accumulated in the storage of the relay device.

Processing 2407 to perform a position registration request is executed by the position registration request unit 412. In the processing 2407, a position registration request is performed to register the terminal identifier of the data generating source terminal which has generated the accumulated data, the data generating point-in-time, and the device identifier of the relay device, in the data position management device 600. This is performed so that the accumulation position of data accumulated in the storage in processing 2406 may be identified from other relay devices as well.

Figure 25:
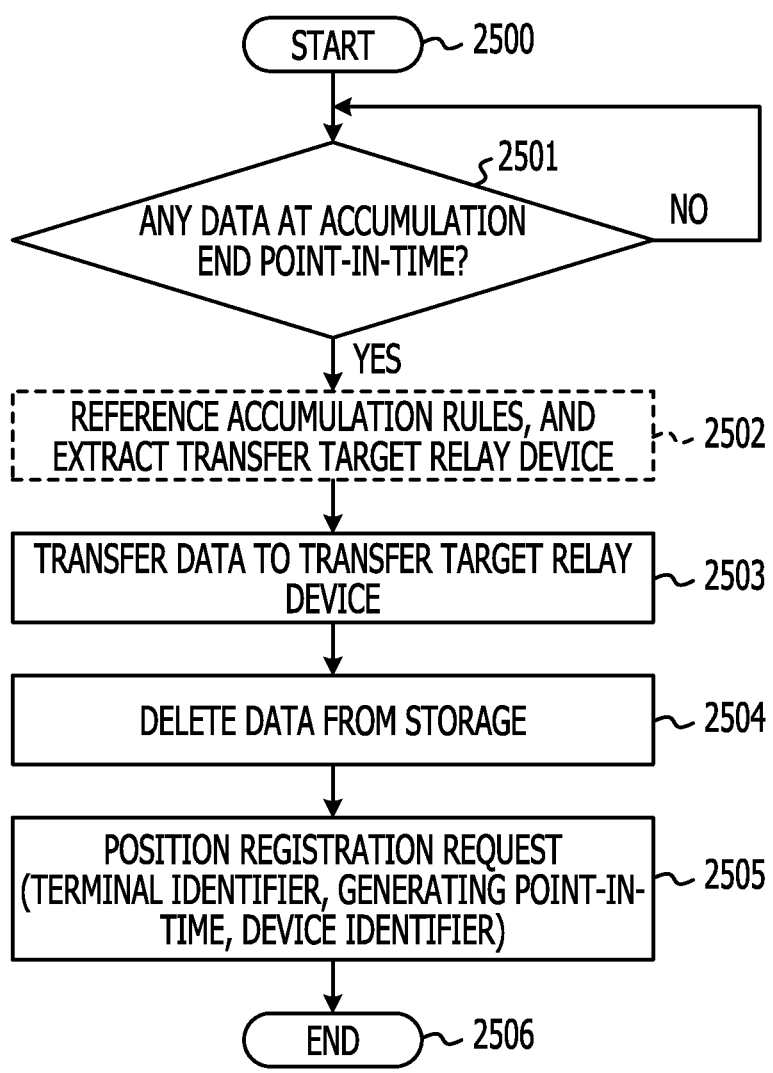
FIG. 25 is an example of processing when relocating data at the relay device according to the embodiment.

FIG. 25 is an example of processing when relocating data at the relay device according to the embodiment. Processing 2501 to determine whether or not there is data at the accumulation end point-in-time is executed by the accumulation time management unit 430. In the processing 2501, time is clocked, and determination is made regarding whether or not there is data held from processing 2404 or 2405 regarding which the accumulation end point-in-time has been exceeded. In a case where there is not data regarding which the accumulation end point-in-time has been exceeded, the processing 2501 is repeated. In a case where there is data regarding which the accumulation end point-in-time has been exceeded, the flow advances to processing 2502.

Processing 2502 to reference accumulation rules and extract the transfer target relay device is executed by the data control unit 420. In processing 2502, accumulation rules relating to data determined that the accumulation end point-in-time has been exceeded in process 2501 are referenced, and the transfer target relay device correlated with this data is extracted. Note that if the processing 2405 has been executed and the transfer target relay device has already been extracted at the accumulation end time, the processing 2502 does not have to be executed.

Processing 2503 to transfer data to the transfer target relay device is executed by a relocation processing unit 421. In the processing 2503, data regarding which determination has been made in process 2501 that the accumulation end point-in-time has been exceeded is read out from the storage, and is transferred to the transfer target relay device via the transmission/reception unit 400.

Processing 2504 to delete data from the storage is executed by a deleting processing unit 423. In the processing 2504, upon transfer of data to be transferred by the processing 2503 ending, this data is deleted from the storage.

Processing 2505 to perform a position registration request is executed by the position registration request unit 412. In the processing 2505, the data has been deleted from the storage in the processing 2504, so a new position registration request is made to the data position management device 600 to update the terminal identifier of the data generating source terminal, the data generating point-in-time, and the device identifier of the relay device. This is so that other relay devices will be able to identify that the data is accumulated in the relay device no more.

Figure 26:
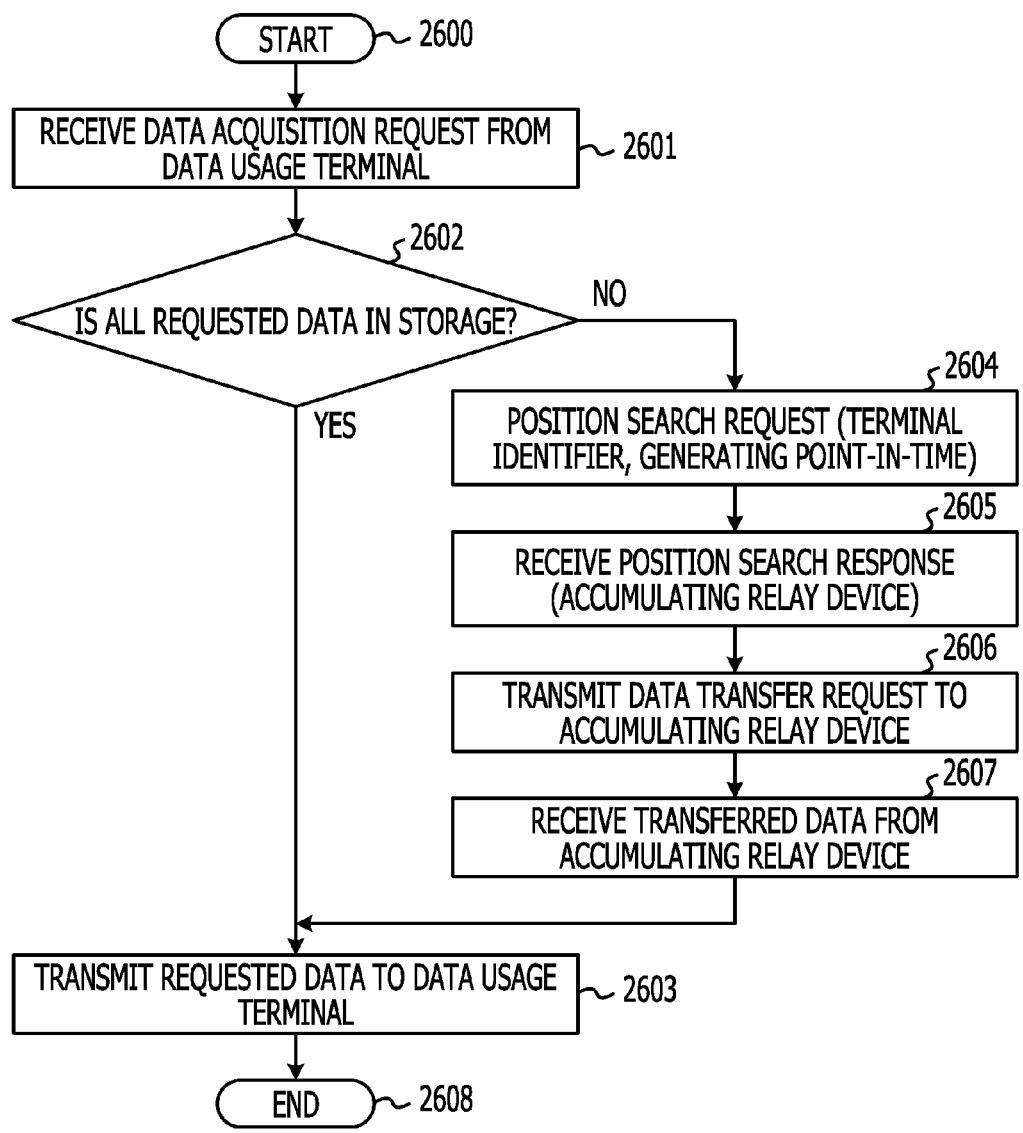
FIG. 26 is an example of processing when requesting acquisition of data at the relay device according to the embodiment.

FIG. 26 is an example of processing when requesting acquisition of data at the relay device according to the embodiment. Processing 2601 to receive a data acquisition request from a data usage terminal is executed by the transmission/reception unit 400. In the processing 2601, the relay device receives a data acquisition request from the data usage terminal.

Processing 2602 to determine whether or not all requested data is in the storage is executed by the data control unit 420. In processing 2602, whether all data requested by the processing 2601 is searched, based on the data accumulated in the storage of the relay device.

In a case where determination is made that all requested data is in the storage, the flow advances to processing 2603, where all requested data is read out from the storage by the relocation processing unit 421, and processing 2603 to transmit the requested data to the data usage terminal is executed. In the processing 2603, the requested data is transmitted to the data usage terminal which is the requesting source, via the transmission/reception unit 400.

In a case where determination is made that not all of the requested data is in the storage in the processing 2602, processing 2604 to make a position search request is executed by the position search request unit 413. In the processing 2604, if the results of the determination in the processing 2602 are that there is data of the requested data not accumulated in its own storage, and the data has to be transferred from another relay device, a position search request is made to the data position management device 600 for this data. The position search request is executed with the terminal identifier of the data generating source terminal and the data generating point-in-time having been identified, to identify the lacking data.

Processing 2605 to receive a position search response is executed by position search request unit 413. In processing 2605, the search results of the position search request in processing 2604 are received from the data position management device 600. The position search response includes information of the accumulating relay device where the lacking data is accumulated.

Processing 2606 to transmit a data transfer request to the accumulating relay device is executed by the transfer request unit 411. In the processing 2606, a transfer request for data which is not accumulated in own storage and has to be acquired separately, is transmitted to the accumulating relay device acquired in processing 2605.

Processing 2607 to receive the data transferred from the accumulating relay device is executed by the transfer request unit 411. Upon receiving the data in processing 2607, the flow advances to processing 2603. Now, in a case where data requested by the data usage terminal is to be transmitted in processing 2603, transmission may be performed after processing 2604 through 2607 have ended and the requested data is all present, or alternatively, the processing 2604 through 2607 may be performed in parallel to transmitting the data already stored in own storage to the data usage terminal.

Figure 27:
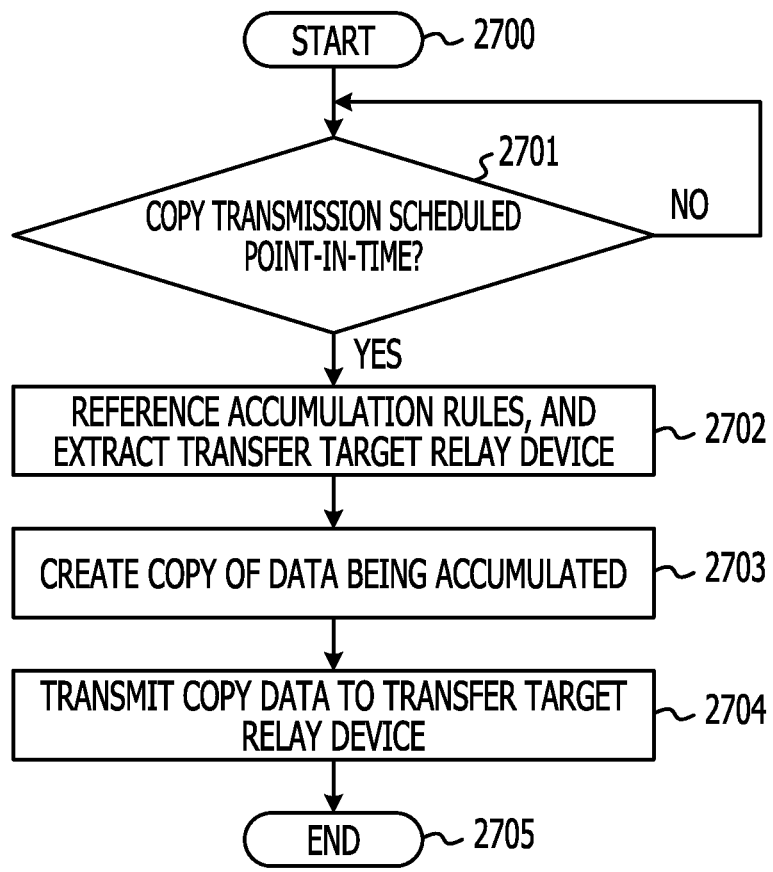
FIG. 27 is an example of processing when copying and transmitting data at the relay device according to the embodiment.

FIG. 27 is an example of processing when copying and transmitting data at the relay device according to the embodiment. This is a processing flow exemplarily illustrating the processing of transmitting of copy of data at the relay device as described following FIG. 17.

Processing 2701 to determine whether or not a copy transmission scheduled point-in-time is executed by the accumulation time managing unit 430. In processing 2701, if the copy transmission scheduled point-in-time is managed for each data generating source terminal set in accumulation rules, time is clocked and a check is made regarding whether or not the copy transmission scheduled point-in-time has arrived for any of the data generating source terminal. In a case where determination is made that the copy transmission scheduled point-in-time has not arrived, the processing 2701 is repeated. In a case where determination is made that a copy transmission scheduled point-in-time has arrived, the flow advances to processing 2702.

Processing 2702 to extract the transfer target relay device is executed by the data control unit 420 making reference to accumulation rules. In processing 2702, accumulation rules, relating to data regarding which determination has been made in processing 2701 that the copy transmission scheduled point-in-time has elapsed, are referenced, and the transfer target relay device correlated with this data is extracted.

Processing 2703 to create a copy of accumulated data is executed by a copy processing unit 422. In processing 2703, a copy is created of data accumulated in storage regarding which determination has been made that the copy transmission scheduled point-in-time has elapsed.

Processing 2704 to transmit copy data to the transfer target relay device is executed by the data control unit 420. In processing 2704, the data copied in processing 2703 is transmitted to the transfer target relay device extracted in processing 2702 via the transmission/reception unit 400.

Figure 28:
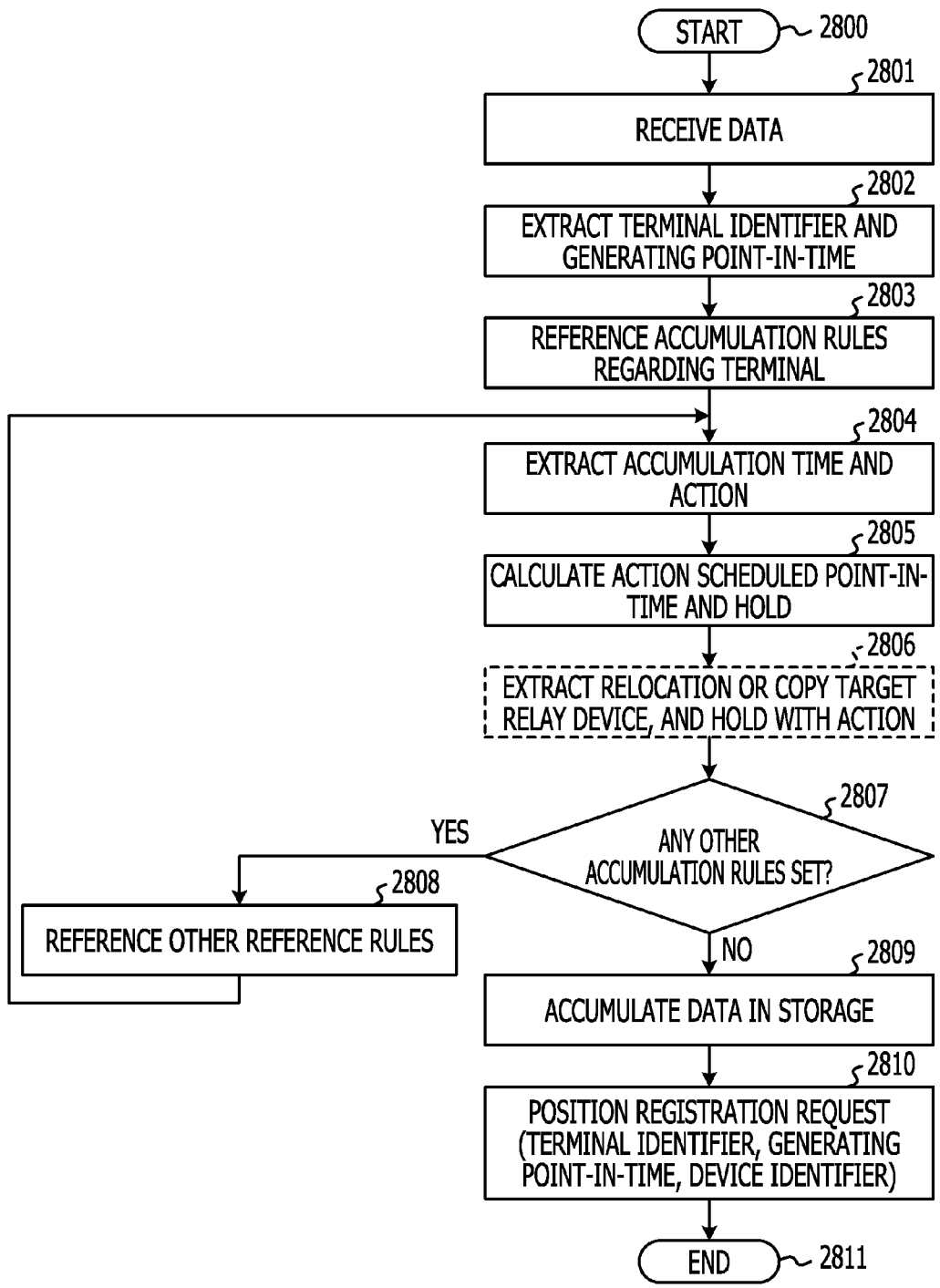
FIG. 28 is another example of processing when receiving data at the relay device according to the embodiment.

FIG. 28 is another example of processing when receiving data at the relay device according to the embodiment. This is a processing flow exemplarily illustrating the processing of receiving data at the relay device as described following FIG. 21.

Processing 2801 to receive data is executed by the transmission/reception unit 400. In processing 2801, the relay device receives a message included sensor data that has been generated by the data generating source terminal.

Processing 2802 to extract the terminal identifier and generating point-in-time is executed by the identification unit 401. In processing 2802, the received message is analyzed, and the terminal identifier of the data generating source terminal and the data generating point-in-time are extracted from the received message.

Processing 2803 to reference accumulation rules regarding the terminal are executed by the identification unit 401. In processing 2803, accumulation rules stipulated regarding the terminal identifier extracted in processing 2802 are referenced.

Processing 2804 to extract accumulation time and action is executed by the data control unit 420. In processing 2804, the accumulation time and action stipulated in the accumulation rules reference in processing 2803 are extracted.

Processing 2805 to calculate and hold an action scheduled point-in-time is executed by the accumulation time managing unit 430. In processing 2805, the scheduled point-in-time for the action is calculated based on the accumulation period stipulated by the accumulation rule reference in processing 2803, and the current point-in-time. The calculated action scheduled point-in-time is then held at the accumulation time managing unit 430.

Processing 2806 to extract a relocate target or copy target relay device and hold along with the action, is executed by the accumulation time managing unit 430 and data control unit 420. Note that the processing 2806 is processing which may be executed instead of processing 2805. In processing 2806, if the action is relocate or copy, from the accumulation rules stipulated in the accumulation rules referenced in processing 2803, the relocate target or copy target relay device is also extracted from the accumulation rules, and information of the extracted relay device is held in the accumulation time managing unit 430 along with the calculated action scheduled point-in-time.

Processing 2807 to determine whether or not there are other accumulation rules set, is executed by the data control unit 420. There are cases where multiple accumulation rules are set regarding the same data generating source terminal, so processing 2807 is to cover these accumulation rules. In a case where determination is made that there are other accumulation rules, the flow advances to processing 2808 where other accumulation rules are referenced and processing 2804 through 2806 is executed. In a case where determination is made that there are no other accumulation rules, the flow advances to processing 2809.

Processing 2809 to accumulate data in storage is executed by the data control unit 420. In the processing 2809, data generated by the data generating source terminal, which is included in the received message, is accumulated in the storage of the relay device.

Processing 2810 to perform a position registration request is executed by the position registration request unit 412. In the processing 2810, a position registration request is performed to register the terminal identifier of the data generating source terminal which has generated the accumulated data, the generating point-in-time of the data and the device identifier of the relay device, in the data position management device 600. This is performed so that the accumulation position of data accumulated in the storage in the processing 2809 may be identified from other relay devices.

Figure 29:
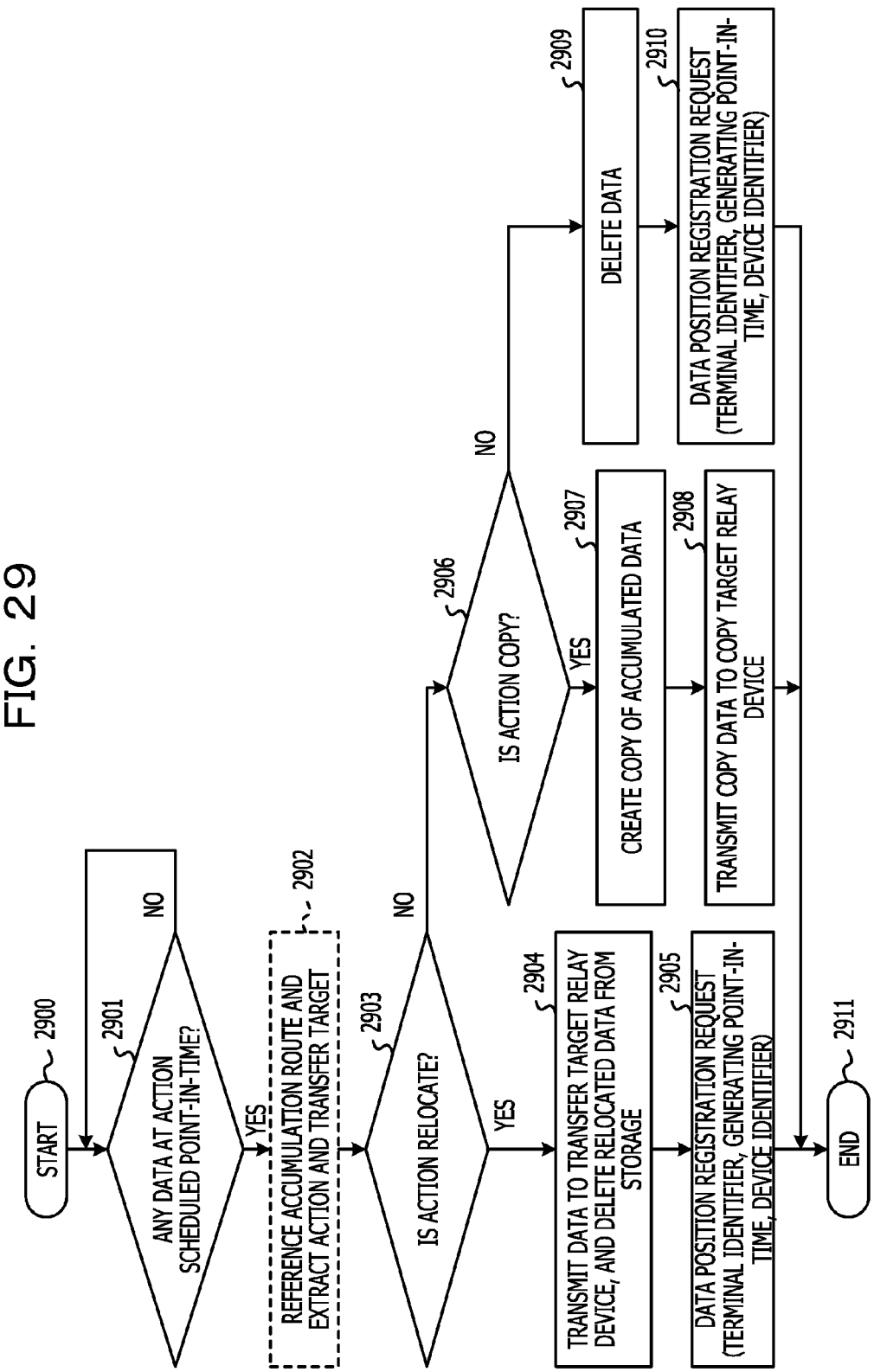
FIG. 29 is an example of action processing at the relay device according to the embodiment.

FIG. 29 is an example of action processing at the relay device according to the embodiment. This is a processing flow exemplarily illustrating the action processing at the relay device as described following FIGS. 21 and 22.

Processing 2901 to determine whether or not there is data of an action scheduled point-in-time is executed by the accumulation time managing unit 430. In processing 2901, time is clocked, and determination is made regarding whether or not there is data held by processing 2805 or 2806 regarding which an action scheduled point-in-time has elapsed. In a case where there is no data regarding which an action scheduled point-in-time has elapsed, processing 2901 is repeated. In a case where there is data regarding which an action scheduled point-in-time has elapsed, the flow advances to processing 2902.

Processing 2902 to reference accumulation rules and extract an action and transfer target is executed by the data control unit 420. In processing 2902, accumulation rules relating to data regarding which determination has been made in processing 2901 that the action scheduled point-in-time has elapsed are referenced, and an action and transfer target relay device correlated with this data are extracted. In a case where processing 2806 has been executed, and accordingly, the action and transfer target relay device have already been extracted along with the action scheduled point-in-time, the processing 2902 does not have to be executed.

Processing 2903 to determine whether or not the action is relocate is executed by the data control unit 420. In a case where the extracted action is relocate, the flow advances to processing 2904, and otherwise advances to processing 2906.

Processing 2904 to transmit data to the transfer target relay device and delete the relocated data from the storage is executed by the relocation processing unit 421 and deleting processing unit 423. In the processing 2904, the data to be relocated is read out from the storage, the data is transmitted to the transfer target relay device, and upon transmission being completed the data that has been relocated is deleted from the storage.

Processing 2905 to perform a data position registration request is executed by the position registration request unit 412. In the processing 2905, the data has been deleted from the storage in the processing 2904, so a data position registration request is made to the data position management device 600 to update the terminal identifier of the data generating source terminal, the data generating point-in-time, and the device identifier of the relay device, in accordance with data accumulated in storage at the current point-in-time. This is so that other relay devices will be able to identify that the data is accumulated in the relay device no more.

In a case where the results of determination in processing 2903 are that the action is not relocate, processing 2906 to determine whether or not the action is copy, is executed by the data control unit 420. In a case where the extracted action is copy, the flow advances to processing 2907, and if not relocate, advances to processing 2909.

Processing 2907 to create a copy of the data being accumulated is executed by the copy processing unit 422. In the processing 2907, data to be copied is read out from storage and a copy is created. Processing 2908 to transmit the copy data to the copy target relay device is then executed by the copy processing unit 422. In the processing 2908, the data copied in the processing 2907 is transmitted to the copy target relay device via the transmission/reception unit 400.

In a case where the results of determination in the processing 2906 are such that determination is made that the action is not copy, processing 2909 to delete data is executed by the deleting processing unit 423. In the processing 2909, data to be deleted is detected for the storage of the relay device.

Processing 2910 to perform a data position registration request is executed by the position registration request unit 412. In the processing 2910, the data has been deleted from the storage in the processing 2909, so a data position registration request is made to the data position management device 600 to update the terminal identifier of the data generating source terminal, the data generating point-in-time, and the device identifier of the relay device, in accordance with data accumulated in storage at the current point-in-time. This is so that other relay devices will be able to identify that the data is accumulated in the relay device no more.

Figure 30:
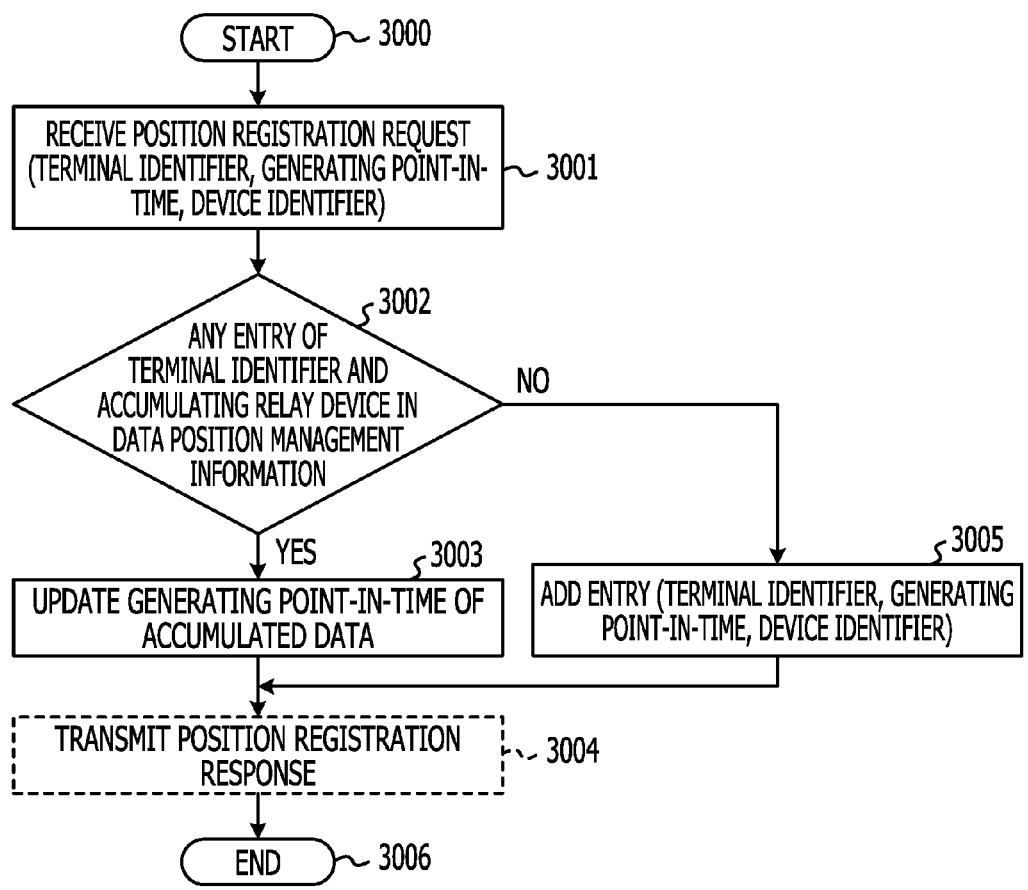
FIG. 30 is an example of processing for position registration at the data position management device.

FIG. 30 is an example of processing for position registration at the data position management device. Processing 3001 to receive a position registration request is executed by the message processing unit 501. In the processing 3001, a position registration request transmitted from a relay device is received via the transmission/reception unit 500, and processing is requested to the position registration processing unit 511.

Processing 3002 to determine whether or not there is an entry of a terminal identifier and accumulating relay device in the data position management information is executed by the position registration processing unit 511. In processing 3002, the data position management information is referenced and confirmation is made regarding whether or not there is an entry of the relay device which is the position registration request source, based on the terminal identifier of the data generating source terminal included in the position registration request. In a case where there is an entry, the flow advances to processing 3003, and if there is no entry, the flow advances to processing 3005.

Processing 3003 to update the generating point-in-time of the accumulated data is executed by the position registration processing unit 511. In the processing 3003, the generating point-in-time or range of generating point-in-time of the accumulated data is updated in the entry to a value included in the position registration request received in the processing 3001.

Processing 3004 to transmit a position registration response is executed by the message processing unit 501. In the processing 3004, a response message making notification to the effect that position registration by the position registration processing unit 511 is created, and transmitted to the relay device which is the requesting source via the transmission/reception unit 500. Note that this processing of transmitting the position registration response may be omitted.

In a case where determination is made as a result of processing 3002 that there is no entry, processing 3005 to add an entry is executed by the position registration processing unit 511. In processing 3005, the terminal identifier, the generating point-in-time or range of generating point-in-time of the data, and the device identifier of the accumulating relay device, included in the position registration request received in processing 3001, are added to the data position management information.

Figure 31:
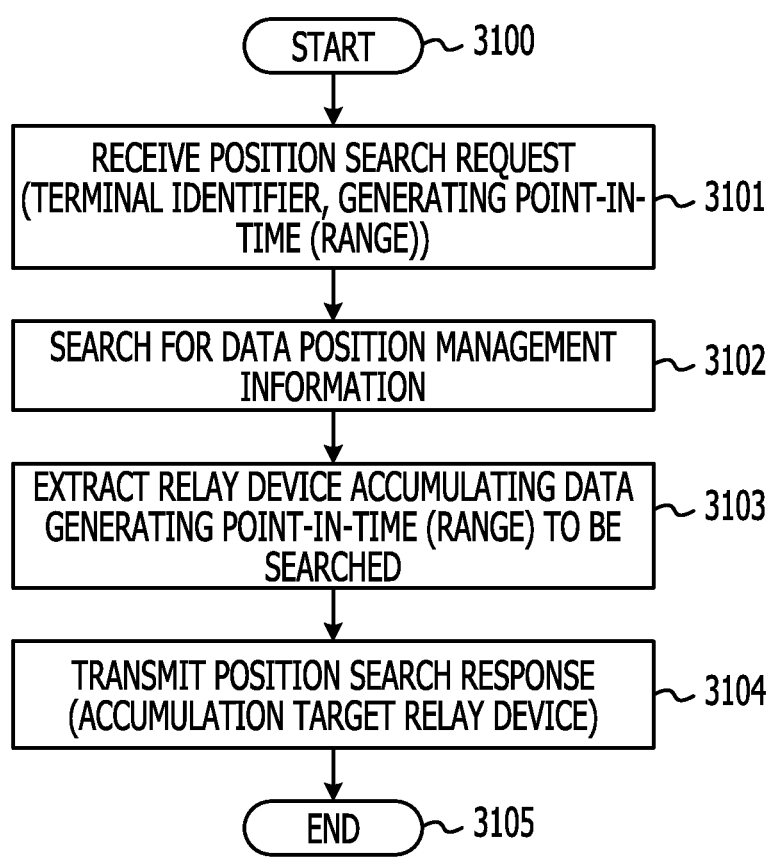
FIG. 31 is an example of processing for position search at the data position management device.

FIG. 31 is an example of processing for position search at the data position management device. Processing 3101 to receive a position search request is executed by the message processing unit 501. In processing 3101, the position search request transmitted from the relay device is received via the transmission/reception unit 500, and a request for processing is made to the position search processing unit 512.

Processing 3102 to search for data position management information is executed by the position search processing unit 512. In the processing 3102, data position management information is searched for, based on the terminal identifier of the data generating source terminal and the data generating point-in-time or range of generating point-in-time of the data, included in the position registration request received in the processing 3101.

Processing 3103 to extract the relay device accumulating the data generating point-in-time (range) being searched for is executed by the position search processing unit 512. In the processing 3103, the relay device accumulating data of the generating point-in-time or range of generating point-in-time, out of the data generated by the data generating source terminal, is extracted based on the data position management information. Depending on the range of the generating point-in-time being searched, multiple relay devices may be extracted.

Processing 3104 to transmit a position search response is executed by the message processing unit 501. In the processing 3104, a response message including the information of the accumulating relay device searched in processing 3103 is created, and transmitted to the relay device which is the request source via the transmission/reception unit 500.

As described above, according to the embodiment, in a case where an application executed at a terminal uses data of different time ranges from different locations, the data is relocated within the network in accordance with the time elapsed after the data was generated, so that the data will be accumulated in a relay device suitable for the application. The accumulation period at the relay device and the transfer target are then set as appropriate based on the geographical location of the data generated by the terminal and the object of using the data. Accordingly, the amount of time for the application to acquire data from the relay device or server may be reduced.

For example, upon receiving data from a data generating source terminal, a relay device accumulates this data, and manages the accumulation period thereof based on a time range of the data which a first application, requesting data acquisition to the relay device, uses. Thereafter, control is performed such that the data regarding which the accumulation period has elapsed, is relocated beforehand to a relay device near a second application, which has a longer time range for the data to be used.

In a case where there is overlapping of time ranges of the data to be used by the first and second applications, a request for the overlapping data is made from the relay device which is the data relocate target relay device, which is the relay device which has received a data acquisition request from the second application, to the relocate source relay device. Alternatively, the overlapping portion of data is copied and transferred from the relocate source relay device to the relocate target relay device, before the data acquisition request from the second application.

Also, in a case of having performed data accumulation or relocate at the relay devices, a terminal identifier of the data generating source terminal, time range of generating point-in-time, and an identifier for identifying the relay device accumulating the data, are registered in a data position management device. A relay device which has received a data acquisition request from an application makes a search request to the data position management device regarding requested data not stored in itself, identifies the relay device accumulating the data, and makes a data acquisition request.

According to the embodiment described above, data may be accumulated such that delay time and traffic amount are reduced when applications access data, without increasing storage capacity to accumulate data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system comprising:
a terminal apparatus connected to a network and including a first processor configured to transmit data via the network in a first time interval, the data including time information indicating when the data is generated and a terminal identification of the terminal apparatus;
a first relay apparatus connected to the network and including a first storage and a second processor;
a second relay apparatus connected to the network;
a destination apparatus connected to the network; and
a first processing apparatus connected to the network and including a third processor,
wherein the second processor of the first relay apparatus is configured to:
receive the data from the terminal apparatus in the first time interval;
identify a rule relating to the terminal identification included in the data, the rule including the terminal identification and an accumulation period of the data in the first storage;
calculate an accumulation end time of the data based on the accumulation period and the time information included in the data;
store, into the first storage, the data at or before the accumulation end time;
in response to a request for the data, transmit the data acquired from the first storage to a source of the request for the data;
relay the data to at least one of the second relay apparatus and the destination apparatus which accumulates the data after the accumulation end time; and
delete the data from the first storage after the data is relayed,
wherein the third processor of the first processing apparatus is configured to:
transmit the request for the data to the first relay apparatus in a second time interval; and
acquire the data from the first relay apparatus,
wherein the accumulation period is set based on the second time interval, and
wherein the first time interval is equal to or shorter than the second time interval.

2. The system of claim 1, wherein
the terminal apparatus is a sensor configured to monitor information relating to a service and to generate the data based on the information monitored.

3. The system of claim 2, wherein
the sensor is set up at a sales position relating to the service.

4. The system of claim 2, wherein
the destination apparatus is included in a data center being configured to manage the service based on the data.

5. The system of claim 2, wherein
the first processing apparatus is configured to do an activity relating to a delivery of a product of the service based on the data.

6. The system of claim 1 wherein the second relay apparatus includes a second storage and a fourth processor configured to:
store, into the second storage, the data relayed from the first relay apparatus on or before another accumulation end time, the another accumulation end time being calculated based on another rule and the time information, the another rule including the terminal identification and another accumulation period;
in response to another request for the data, transmit the data acquired from the second storage to a source of the another request relay the pieces of data to the destination apparatus after the another accumulation end time; and
delete the data from the second storage after the data is relayed,
further comprising a second processing apparatus configured to:
transmit the another request to the second relay apparatus in a third time interval; and
acquire the data from the second relay apparatus,
wherein the another accumulation period is set based on the third time interval in which the second processing apparatus transmits the another request, and
wherein the second time interval is equal to or shorter than the third time interval.

7. The system of claim 6, wherein
the terminal apparatus is a sensor configured to monitor information relating to a service and to generate the pieces of data based on the information,
the second processing apparatus is configured to perform an activity relating to a manufacturing of a product of the service based on the pieces of data.

8. The system of claim 6, wherein
a capacity of the first storage is equal to or smaller than a capacity of the second storage.

9. The system of claim 6, wherein
the second relay apparatus is configured to request data that is included in the third time interval but is not stored in the second relay apparatus to the first relay apparatus.

10. The system of claim 8, wherein
the first relay apparatus is configured to transmit the data to the second relay apparatus after the first processing apparatus acquires the data.

11. The system of claim 7, wherein
the destination apparatus is configured to process the accumulated data during a time range equal to or longer than the accumulation period and another accumulation period.

12. The system of claim 1, wherein
the first relay apparatus is configured to copy the stored data and to relay the copied data to the destination apparatus.

13. The system of claim 1, wherein
the first relay apparatus is configured to store the data in the first relay apparatus based on the time information by delaying the relaying of the data to the destination apparatus.

14. A method comprising:
receiving data, from a terminal apparatus in a first time interval, the data including time information indicating when the data is generated and a terminal identification of the terminal apparatus;
identifying a rule relating to the terminal identification included in the data, the rule including the terminal identification and an accumulation period of the data in a first storage;
calculating an accumulation end time of the data based on the accumulation period and the time information included in the data;
storing, into the first storage, the data at or before the accumulation end time;
receiving a request for the data from a processing apparatus during a second time interval;
in response to the request for the data, transmitting the data acquired from the first storage to a source of the request for the data;
relaying the data to at least one of a relay apparatus and a destination apparatus which accumulates the data after the accumulation end time; and
deleting the data from the first storage after the data is relayed,
wherein the accumulation period is set based on the second time interval, and
wherein the first time interval is equal to or shorter than the second time interval.

15. A non-transitory computer-readable medium including a program, which when executed by a system, causes the system to:
receive data, from a terminal apparatus in a first time interval, the data including time information indicating when the data is generated and a terminal identification of the terminal apparatus;
identify a rule relating to the terminal identification included in the data, the rule including the terminal identification and an accumulation period of the data in a first storage;
calculate an accumulation end time of the data based on the accumulation period and the time information included in the data;
store, into the first storage, the data at or before the accumulation end time;
receive a request for the data from a processing apparatus during a second time interval;
in response to the request for the data, transmit the data acquired from the first storage to a source of the request for the data;
relay the data to at least one of a relay apparatus and a destination apparatus which accumulates the data after the accumulation end time; and
delete the data from the first storage after the data is relayed,
wherein the accumulation period is set based on the second time interval, and
wherein the first time interval is equal to or shorter than the second time interval.

16. An apparatus comprising;
a memory; and
a processor coupled to the memory and configured to:
receive data transmitted from a terminal apparatus in a first time interval, the data including time information indicating the data is generated and a terminal identification of the terminal apparatus;
identify a rule relating to the terminal identification included in the data, the rule including the terminal identification and an accumulation period of the data in a first storage;
calculate an accumulation end time of the data based on the accumulation period and the time information included in the data;
store, into the first storage, the data at or before the accumulation end time;
receive a request for the data from a processing apparatus during a second time interval;
in response to the request for the data, transmit the data acquired from the first storage to a source of the request for the data;
relay the data to at least one of a relay apparatus and a destination apparatus which accumulates the data after the accumulation end time; and
delete the data from the first storage after the data is relayed,
wherein the accumulation period is set based on the second time interval, and
wherein the first time interval is equal to or shorter than the second time interval.

* * * * *